United States Patent [19]

Nabeya et al.

[11] Patent Number: 5,781,433
[45] Date of Patent: Jul. 14, 1998

[54] SYSTEM FOR DETECTING FAILURE IN INFORMATION PROCESSING DEVICE

[75] Inventors: Kenichi Nabeya; Tatsumi Nakada, both of Kawasaki, Japan

[73] Assignee: Fujitsu Limited, Kawasaki, Japan

[21] Appl. No.: 406,075

[22] Filed: Mar. 17, 1995

[30] Foreign Application Priority Data

Mar. 17, 1994 [JP] Japan ................... 6-047547

[51] Int. Cl.⁶ ........................ G05B 9/02
[52] U.S. Cl. ............. 364/184; 364/187; 395/182.09; 395/182.11
[58] Field of Search ............ 364/131–134, 364/184–187, DIG. 1, 200.05; 371/48, 67.1, 68.2; 395/180, 181, 182.04, 182.08, 182.09, 182.1, 182.11, 568

[56] References Cited

U.S. PATENT DOCUMENTS

| | | | |
|---|---|---|---|
| 5,142,470 | 8/1992 | Bristow et al. | 364/184 |
| 5,185,693 | 2/1993 | Loftis et al. | 364/187 |
| 5,249,188 | 9/1993 | McDonald | 364/132 |
| 5,416,908 | 5/1995 | DiCarlo et al. | 395/275 |

*Primary Examiner*—Reba I. Elmore
*Assistant Examiner*—Thomas E. Brown
*Attorney, Agent, or Firm*—Staas & Halsey

[57] ABSTRACT

In a computer system having a coprocessor dedicated to arithmetic operations, one of the coprocessor and CPU is equipped with an abnormality decision section and the other is equipped with a transmission section which transmits to the abnormality decision section signals by which the abnormality decision section is permitted to decide whether abnormality has occurred. In a first arrangement, upon detecting that an instruction transferred from the CPU is abnormal, the coprocessor turns off a flag indicating that it is active. In the CPU, its internal storage state indicates that the coprocessor is active and the flag is received which indicates that the coprocessor is inactive. Thereby, the CPU is permitted to decide that abnormality has occurred. In a second arrangement, upon detecting abnormality, the coprocessor turns off that flag indicating that it is active and turns on a flag indicating that the buffer is full. By receiving this signal state which cannot usually exist, the CPU is permitted to decide that abnormality has occurred.

18 Claims, 26 Drawing Sheets

SYSTEM FOR DETECTING FAILURE IN INFORMATION PROCESSING DEVICE

BACKGROUND OF THE INVENTION

1. Field of the Invention

The present invention relates to a computer system and, more particularly, to an information processing device for managing the state of a computer system having a coprocessor dedicated to mathematical operations.

2. Description of the Related Art

To enhance processing capabilities of computer systems, a technique referred to as pipeline processing is used in processors as well, which begins the processing of a second instruction while still processing the present one. In this pipeline processing, it is necessary to examine a dependence relationship among instructions such as a dependence relationship among general purpose registers that are operands in instructions.

As an example of a dependence relationship among general purpose registers, suppose that a general register is written into by an instruction, then read from by the immediately succeeding instruction. In this case, it is required for the succeeding instruction to wait until the general register has been written into by the preceding instruction.

FIG. 1 is a diagram for use in explanation of exemplary programs and their execution. In the program on the second line, the result in register GR3 on the first line is used for arithmetic operation. In the execution of the program on the first line, register GR3 is written into at the termination of that program. In the execution of the program on the second line, the result in register GR3 is read, then added to the content in register GR4. The result of this addition is then written into register GR5. Thus, there is a dependence relationship between those programs in which register GR3 is written into on one hand and register GR3 is read from on the other hand.

As a method of protecting a dependence relationship between general purpose registers, there is a method of using a flag register, called a scoreboard, indicating that each of the general purpose registers is busy or not.

For example, when a general register is written into by the preceding instruction, the following operations are performed on the scoreboard. That is, at the start of instruction execution, that flag bit in the scoreboard which corresponds to that general register to be written into is set to 1, thereby indicating that the general register is busy. When the general register has been written into, that flag bit in the scoreboard is reset to 0, thereby indicating that the general register is not busy.

When the general register is to be written into or read from by the succeeding instruction, that flag bit in the scoreboard which corresponds to the general register is referred to, thus protecting the general register dependence relationship. That is, when a flag bit in the scoreboard is not set to 1, the corresponding register is not busy and the succeeding instruction is thus allowed to write into or read from the register. If, on the other hand, that flag bit is set to 1, the register is busy and the preceding instruction may write into the register. In this case, the succeeding instruction is allowed to write into or read from the register after making sure that the register has been written into by the preceding instruction by referring to the scoreboard flag bit that has been reset.

FIG. 2 illustrates a manner of program execution. To execute a preceding instruction, for example, mlt, it is decoded first. Prior to the execution of the instruction, a scoreboard operation (Set) is performed, so that the flag bit in the scoreboard corresponding to a register is set to 1. If, when the succeeding instruction is decoded, it is to use that register, the flag bit in the scoreboard that corresponds to the register is referred to. At this point, the flag bit is 1, so that the succeeding instruction is placed in the wait state. When data is stored in the register at the termination of the execution of the preceding instruction, the flag bit in the scoreboard corresponding to a register is reset to 0. As a result, the succeeding instruction leaves the wait state and is then executed after the succeeding instruction is decoded.

By the above operations, pipeline processing can be performed properly for access to a register having an instruction dependence relationship.

The above-described scoreboard is likewise used with a processing system having a coprocessor. In such a system, for example, CPU executes a coprocessor instruction and transfers data and commands to the coprocessor. The coprocessor processes the data and commands. Depending on instructions, the coprocessor may write the results of processing into registers provided in the CPU (so-called scalar write). In this case, CPU performs the following operations:

(1) CPU monitors the scoreboard and waits until a general register in which data to be transferred to the coprocessor is stored becomes read enabled and a register in the CPU (hereinafter referred to as a CPU register) to be written into by the coprocessor becomes write enabled, that is, until it becomes possible to issue a coprocessor instruction.

(2) When it becomes possible to issue a coprocessor instruction, that flag bit in the scoreboard which corresponds to a CPU register into which data output from the coprocessor is to be written is set to 1.

(3) The coprocessor instruction is executed to transfer data and commands to the coprocessor.

(4) Data that the coprocessor outputs is written into the CPU register.

(5) The flag bit in the scoreboard is reset to 0.

When the coprocessor instruction is executed to transfer data and commands to an instruction buffer in the coprocessor, register number information as to which of CPU registers data to be output from the coprocessor is to be written into is retained in a CPU buffer (write address buffer). In writing coprocessor output data into the CPU register, therefore, the coprocessor has only to output data. That is, there is no need of outputting register number information.

Hereinafter, the operation of a CPU system having a coprocessor will be described in more detail.

FIG. 3 is a block diagram of a conventional CPU 18. This CPU 18 is connected to a coprocessor 19 which will be described later. CPU 18 comprises a decoder 1, a register file (GR) 2, a scoreboard 3, an arithmetic logic unit (ALU) 4, a controller 5, a write address buffer 6, and a copro-interface 7.

Although signal names differ from signal terminals of the respective circuit components, "ALU_WE signal output from ALU_WE terminal" by way of example will be abbreviated to "ALU_WE" for better understanding of the description in the present specification. The same applies to other signals.

The decoder 1 is a circuit which decodes an instruction (an operation code) to determine what it is like. For an instruction being decoded, the decoder 1 makes decisions as to:

(1) whether it is issued to the ALU 4 or the coprocessor;
(2) what operation it is to perform;
(3) which of source registers it is to read from; and
(4) which of destination registers it is to write into.

When the instruction is issued to the ALU 4, the decoder outputs an ALU operation code ALU_OPCODE to the ALU 4. When the instruction is to write the result of an arithmetic operation into a register, ALU_WE is set to 1 (a flag is set). When the instruction is not for the ALU, ALU_WE is reset to 0 (the flag is reset). In this case, the result of the ALU operation will never be written into the register (GR2). Thus, whatever operation the ALU may perform, there is no problem.

When the instruction being decoded is a coprocessor instruction, a COPRO_VALID flag is set and a coprocessor operation code COPRO_OPCODE is output. When the coprocessor instruction is to write the result of processing into a CPU register (scalar write), a COPRO_WE flag is set. When the instruction being decoded is not a coprocessor instruction, the COPRO_VALID flag and the COPRO_WE flag are reset.

How many source registers are to be read from and whether a destination register is to be written into or not vary with instructions. Thus, register number fields may be valid or invalid. Therefore, the source register number field values are output to SRC_REG_ADR0 and SRC_REG_ADR1 and SRC0_USED and SRC1_USED flags are set when they are valid (when source registers are to be read from). The destination register number field value is output to DIST_REG_ADR and a DIST_REG_USED flag is set when it is valid (when the destination register is to be written into).

FIG. 4 shows an arrangement of decoder 1. A main decoder 11 is a unit which accepts and decodes an operation code. At the termination of decoding, main decoder 11 sets a D_LAST_FLOW signal to 1 to make a request to an operation code supply unit (not shown) for a new operation code. In FIG. 4, there is illustrated only an arrangement adapted to decode a coprocessor instruction.

An instruction is decoded by main decoder 11 into DIST_REG_ADR1, COPRO_W_ADR2 and SC_W_L_CPU. When the SC_W_L_CPU value is 2, DIST_REG_ADR1 is output in the first cycle to DIST_REG_ADR and COPRO_W_ADR2 is output in the second cycle to DIST_REG_ADR. To D_LAST_FLOW are output 0 in the first cycle and 1 in the second cycle. Thus, a coprocessor instruction is executed in two cycles.

When SC_W_L_CPU=1, DIST_REG_ADR1 is output. To D_LAST_FLOW is output 1, executing a coprocessor instruction in one cycle.

When SC_W_L_CPU=0, any output may be output to DIST_REG_ADR1 because 0 is output to COPRO_WE (see FIG. 3). To D_LAST_FLOW is output 1, thereby terminating a coprocessor instruction in one cycle.

The description will be given in more detail. When SC_W_L_CPU=2, 0 is output to the output terminal (OUT) of comparator 12, so that the output of AND gate 13 also goes to 0. When D_STAGE_RELEASE=1, therefore, D_LAST_FLOW will also go to 1. Since 0 is input to flip-flop 14 (FF), DIST_REG_ADR1 is selectively output as the DIST_REG_ADR output.

When SC_W_L_CPU=2, the output of comparator 12 goes to 1. Since the output Q of flip-flop 14 is 0, the output of AND gate 13 goes to 1. Even if D_STAGE_RELEASE is 1, therefore, AND gate 15 is turned off, so that D_LAST_FLOW goes to 0. For this reason, the second cycle is started without terminating a coprocessor instruction in the first cycle. Since the input to flip-flop 14 is 1 in the first cycle, the output of the flip-flop goes to 1 in the second cycle. Thus, selector 16 selects COPRO_W_ADR2 as DIST_REG_ADR. Since the inversion input of AND gate 13 goes to 1, its output goes to 0. This causes the output of AND gate 15, i.e., D_LAST_FLOW, to go to 1. In the next cycle, the output of flip-flop 14 will go to 0.

Register file 2 is used to preserve arguments and results of arithmetic operations. Since, as described above, ALU 4 and coprocessor 19 may write into register file 2 simultaneously, the register file 2 has two write ports. Each of an ALU instruction and a coprocessor instruction reads from up to two registers, but both the instructions will not read from the register file simultaneously; thus, two read ports are adequate.

Register file 2 outputs the contents of a register specified by RD_ADR0 to RD_DATA0. Likewise, the contents of a register specified by RD_ADR1 is output to RD_DATA1. When write enable WE0 is set, register file 2 writes the value of WR_DATA0 into a register specified by WR_ADR0. Likewise, when WE1 is set, the WR_DATA1 value is written into the WR_ADR1 register.

Scoreboard 3 is a circuit for protecting the register dependence relationship.

ALU 4 in FIG. 3 needs one clock between the moment that an arithmetic operation is started and the moment that the results are written into a register, but coprocessor 19 needs more than one clock. If, therefore, the succeeding instruction is to read from a register in the register file which is to be written into by coprocessor 19, it might well read from that register before the coprocessor actually writes into. For this reason, it is required for the succeeding instruction to read from the register after making sure that the coprocessor has actually written into the register. The scoreboard is provided for the purpose of protecting such a dependence relationship.

The scoreboard is used in the following manner. At the start of execution of an instruction to write into a register, scoreboard 3 is set to indicate that the register is busy. After the register has been written into, scoreboard 3 is reset, indicating that the register is not in use. To read from the register, the succeeding instruction checks the scoreboard to make sure that the register is not in use. When the register is in use, the decoding stage is repeated until it becomes available.

The scoreboard has three ports, RD0_CHK, RD1_CHK, WR_CHK, used to check whether registers are in use or not, one port, WR_SET, used to make the registers be in use, and one port, WR_RES, used to make the registers be not in use. An instruction uses up to two registers for arguments; thus, two ports are provided for checking. An ALU instruction writes into a register at one clock; thus, there is no need of setting/resetting the scoreboard. For a coprocessor instruction, two ports are provided which make registers be in use and be not in use, respectively.

Specifically, scoreboard 3 operates in the following manner. When the scoreboard bit specified by register number RD0_CHK is set, the RD0_CHK register is in use; thus, the SRC0_BUSY flag is set. Likewise, for register numbers RD1_CHK and WR_CHK, SRC1_BUSY and WR_BUSY flags are set when in use.

When D_STAGE_RELEASE and D_WE are set, which indicates the termination of decoding of a register write instruction and the start of an operation, the scoreboard bit specified by WR_SET is set, making the WR_SET register be not in use. Since an ALU-based operation is terminated in one clock, there is no need of setting the scoreboard.

When write enable W_WE is set, which indicates that the WR_RES register will be written into, the scoreboard bit specified by the register number WR_RES is reset, placing the register in the unused state.

Controller 5 checks the scoreboard to make a decision as to whether the decoding stage has been terminated and consequently an operation can be started. When an operation can be started, the D_STAGE_RELEASE flag is set.

If, when an ALU instruction is decoded, the register dependence relationship is satisfied, an operation can be started. To satisfy the register dependence relationship, it is necessary only that the valid register number scoreboard bits be not set. Specifically, when the SRC0_BUSY and SRC0_USED flags, (SRC0_BUSY_SRC0_USED) SRC1_BUSY and SRC1_USED flags, and WR_BUSY and DIST_REG_USED flags (in which a signal name and a signal name flag indicate an output from AND gates), are all reset, the D_STAGE_RELEASE flag is set.

When the COPRO_VAL flag is set, an coprocessor instruction is being decoded. In addition to the above conditions, if the following conditions:

(1) the COPRO_INTERFACE is not in operation; and
(2) the Write_Address_Buffer is not in use (in the case of a scalar write instruction) are satisfied, the decoding stage can be terminated. That is, controller 5 sets the D_STAGE_RELEASE flag when the SRC0_BUSY and SRC0_USED flags, SRC1_BUSY and SRC1_USED flags, WR_BUSY and DIST_REG_USED flags, COPRO_IF_BUSY flag, BUFFER_FULL flag, COPRO_WE and WAB_USED flags are all reset. In other words, if at least one of these flags is set, the controller will not set the D_STAGE_RELEASE flag.

Thus, the controller 5 comprises AND gates 51 to 56 and a NOR gate 57 shown in FIG. 5. The SRC0_BUSY and SRC0_USED flags are ANDed in AND gate 51, the SRC1_BUSY and SRC1_USED flags are ANDed by AND gate 52, the WR_BUSY and DIST_REG_USED flags are ANDed by AND gate 53, the COPRO_WE and WAB_USED flags are ANDed by AND gate 54, the COPRO_VALID and BUFFER_FULL flags are ANDed by AND gate 55, and the COPRO_VALID and COPRO_IF_BUSY flags are ANDed by AND gate 56. When these flags are all reset, the decoding stage is terminated, so that NOR gate 57 sets the D_STAGE_RELEASE flag to 1.

ALU 4 is a circuit for performing arithmetic operations and logical operations required in CPU 18. At the decoding stage, decoder 1 specifies which type of operation is to be performed (OPCODE), which arguments are to be used for the operation (RD_DATA0, RD_DATA1), whether the results of the operation is to be written into a register (WE), and which register the results of the operation is to be written into. The results of such decoding are applied to ALU 4. Upon termination of the decoding, ALU 4 starts the specified operation. When the results of the operation need not be written into a register, no problem arises even if superfluous operations are performed except when an ALU instruction is executed. Thus, there is no need of setting a flag indicating whether an operation is to be performed or not.

ALU 4 operates in the following manner. When the D_STAGE_RELEASE flag is set, OPCODE, DIST_REG_ADR, WE, RD_DATA0 and RD_DATA1 are fed into a register in the ALU synchronously with a clock. An operation specified by the OPCODE is performed with the RD_DATA0 and RD_DATA1 used as arguments (they may not be used), and the results are output to WR_DATA.

WE being set indicates that an instruction being decoded is the one to write the results of an operation into a register.

The WE value held in the ALU is output to DATA_WE and the register number DIST_REG_ADR held in the ALU is output to WR_ADR.

Write address buffer 6 preserves the number of that register in CPU 18 which is written into by coprocessor 19. For an instruction, of coprocessor instructions, which performs the writing (scalar write) into a CPU register, the write address buffer is used to preserve on the CPU side information as to which register is to be written into. The register number is stored in this buffer at the termination of the decoding stage and taken out when the coprocessor performs the scalar writing.

When the decoding of a scalar write coprocessor instruction is terminated, D_STAGE_RELEASE and BUFFER_WE are set. In this case, the register number WR_ADR_IN is stored in an internal buffer, and an entry bit is set to indicate that the corresponding entry in the buffer is valid.

When the coprocessor 19 performs the scalar write, SC_W_DATA_VAL is set. In that case, the register number is taken from the buffer's valid entry to WR_ADR_OUT, and the write enable flag SC_WE is set.

The above-described buffer preserves only the number of at least one register that is written into by one coprocessor instruction. When at least one register number is preserved, the WAB_USED flag is set so that the decoding of the subsequent scalar write coprocessor instruction will not be terminated.

The write address buffer 6 is a circuit which stores the register address for storage in the file register by the coprocessor, i.e., the scalar write address.

FIG. 6 shows an arrangement of the conventional write address buffer 6, which is provided with five flip-flops. Flip-flop 61 (ADR1) stores the number of a register to be scalar-written into. Flip-flop 62 (ADR2) stores the number of a register which is to be written into in the second scalar write operation when the scalar write is performed twice. Flip-flop 64 (FFD) stores which of flip-flops 61 and 62 a WR_ADR_IN signal is to be stored in at the time of decoding a coprocessor instruction. In the case of flip-flop 61, FFD stores 0. Flip-flop 63 (FFSC) determines which of addresses ADR1 and ADR2 is to be output to WR_ADR_OUT at scalar write time. When the output Q of flip-flop 63 is 0, the address ADR1 is output as a WR_ADR_OUT signal. Flip-flop 65 (FFU) stores a 1 when WRITE_ADDRESS_BUFFER is used.

Hereinafter, a further description will given of the operation of the write address buffer when a coprocessor instruction is decoded.

When a scalar write coprocessor instruction is decoded, addresses ADR1 and ADR2 are stored in flip-flops 61 and 62, respectively.

The initial value of flip-flop 64 is 0. With a coprocessor instruction for performing scalar write, the output of AND gate 60 goes to 1. Thus, the output of AND gate 66 goes to 1, permitting WR_ADR_IN to be stored in flip-flop 61. Since SC_W_DATA_VA1 is 0, the output of NAND gate 67 is 1. Thus, a 1 is stored in flip-flop 65.

The output of flip-flop 64 is 1 with the result that the output of inverter 68 is 1. When the output of AND gate 60 goes to 1, therefore, flip-flop 64 is enabled to store a 1, the output of inverter 68. In the case of a coprocessor instruction which performs the scalar write on two registers, the output of AND gate 60 goes to 1 again in the next cycle. Since flip-flop 64 stores 1, the output of AND gate 69 goes to 1. Thus, WR_ADR_IN is stored in flip-flop 62. Since SC_W_DATA_VAL is 0, the output of NAND gate 67 is 1, and the output of flip-flop 65 remain at 1. Since the output of flip-flop 64 is 1, the output of inverter 68 is 0. Thus, a 0 is stored in flip-flop 64.

When the scalar write is performed, the outputs of flip-flops 61 and 62 are output to WR_ADR_OUT. First, SC_W_DATA_VAL goes to a 1. The outputs of flip-flops 63, 64 and 65 are 0, 0 and 1, respectively. Since the select signal is 0, the output of flip-flop 61 is selected. At this point, the output of NAND gate 67 is 1. When the output of one of flip-flops 63 and 64 is 1 and the output of the other is 0, the output of EX_OR gate 71 goes to 1. The output of AND gate 60 is 1. Thus, the output of NAND gate 67 goes to 0 and flip-flop 65 stores 0. This is because the output of OR gate 73 is 1 and hence flip-flop 65 is enabled. Since the output of flip-flop 63 is 1, the output of inverter 70 is 0. Thus, 0 is stored in flip-flop 63.

Write address buffer 6 accepts the SC_W_DATA_VAL signal and outputs it as an SC_WE signal as it is. The SC_WE signal has the same significance as the SC_W_DATA_VAL signal and goes to a 1 when the coprocessor performs a scalar write operation.

Copro interface 7 operates in the following manner. Copro interface 7 multiplexes data and a command to be transmitted because a limited number of lines are used between coprocessor 19 and CPU 18. The D_STAGE_RELEASE and VALID flags being set indicates that the decoding stage has been terminated and a command and data to be sent to the coprocessor, i.e., DATA0, DATA1, OPCODE, have been entered into the copro interface. Thus, copro interface 7 multiplexes OPCODE (an instruction executed by the coprocessor), RD_DATA0 and RD_DATA1 (instruction parameters) onto COPRO_COM. To inform the coprocessor of the COPRO_COM being valid, the COPRO_COM_VAL flag is set. Information (SC_W_L_LENGTH) as to whether how many registers are to be scalar written into is included in the OPCODE.

For multiplex transmission of the above data, more than one clock are required. During the multiplex transmission, the BUSY flag is set to thereby prevent a new coprocessor instruction from being sent to copro interface 7.

A more detailed description will be given. FIG. 7 shows an arrangement of copro interface 7. When the VALID and D_STAGE_RELEASE flags are both 1s, AND gate 74 produces a 1, which is applied to the enable terminals (CE) of flip-flops 75, 76 and 77 and the reset terminal (RESET) of counter 78.

When a 1 is applied to the enable terminals, flip-flops 75, 76 and 77 take R_DATA0, R_DATA1 and OPCODE at their respective inputs as their respective outputs. A 3-bit up counter 78 starts counting upwards. In response to this, selector 79 first selects and outputs the output of flip-flop 75 as COPRO_COM. The selector 79 next selects the output of flip-flop 76 and finally selects the output of flip-flop 77. The MSB of the 3-bit counter is applied to an inverter 80, whereby the COPRO_COM_VAL and BUSY flags are both set to 1 while the MSB is 0. This permits data and a command to be sent to the coprocessor by the use of a limited number of signal lines.

FIG. 8 shows an arrangement of the conventional coprocessor 19 which is controlled by CPU 18. The coprocessor comprises a buffer which stores data and a command sent from CPU 18, a controller 82 which decodes a coprocessor instruction, an exception unit 83 which performs processing at the occurrence of an exception, a scalar write unit 84 which performs the scalar writing of dummies, for example, and a function unit 85 which performs arithmetic operations as the coprocessor.

The conventional coprocessor is provided with buffer 81 so that it can accept data and commands from CPU 18 even when it is in operation. The provision of this buffer will reduce the number of times the CPU stops because data transmission cannot be made from the CPU to the coprocessor regardless of the absence of a data dependence relationship.

When COPRO_COM_VAL=1 (set), the COPRO_COM is fed into the buffer because it is valid. When READ is set, buffer's data is output. When the buffer is full, the FULL flag is set to a 1. When the buffer is not empty, the BUSY flag is set to a 1. By being notified of the buffer being full with the aid of the FULL flag, CPU 18 stops sending data and commands to the coprocessor when the buffer is full. By reading the BUSY flag, controller 82 can see whether unprocessed data (command) remains in the buffer.

FIG. 9 shows an arrangement of the conventional buffer. When supplied with the COPRO_COM_VAL, an up counter 90 starts counting upwards. A decoder 91 decodes a count in the counter and provides the results of decoding to AND gates 92 to 97.

When COPRO_COM_VAL=1, only one AND gate is turned on by a decoder output at 1, so that the decoder output is applied to the enable terminal CE of a corresponding one of flip-flops 98 to 103. That is, each time the counter counts up, the decoder outputs a 1 on each of its outputs in sequence. Thus, each of AND gates 92 to 97 produces a 1 in sequence so that each of flip-flops 98 to 103 is enabled in sequence. As a result, a command and data on the COPRO_COM are taken into flip-flops 98 to 103. When flip-flop 103 is enabled by AND gate 97 which is supplied with the last decode output, flip-flop 105 is also enabled. The D input of flip-flop 105 is also 1; thus it is set to output a 1. That is, when up counter 90 counts the last count, and decoder 91 decodes the last value, flip-flop 105 is set to produce a 1.

When decoder 91 decodes a specific value, flip-flop 106 is supplied with a 1 at its input D and at its enable terminal through an OR gate 107.

That is, when the specific value is reached by up counter 90, an input D of flip-flop 106 receives a 1 through AND gate 94 and an enable terminal of flip-flop 106 receives a 1 through OR gate 107. Thus, when a set of commands is stored, flip-flop 106 stores a 1. Flip-flop 105 is set to 1 when the maximum buffer become full and flip-flop 103 is enabled. An AND gate 108 connected to the outputs of flip-flops 105 and 106 outputs the FULL flag at 1. When one of flip-flops 105 and 106 is set to 1, an OR gate 109 produces the BUSY flag at 1.

An up counter 110 is incremented by one when it is supplied with a READ signal. In response to up counter 110 a selector 112 selects each of the outputs of the buffer flip-flops in turn as a command. When the maximum count is reached by counter 110, decoder 111 enables flip-flop 105. At this point, the input D of flip-flop 105 is supplied with a 0; thus, it is reset to store a 0. When a command is output, flip-flop 106 is reset, so that the buffer leaves the BUSY state. Though not shown, flip-flops 105, 106, etc., are supplied with a system clock. In this way the buffer can accept data and commands which are sent asynchronously from CPU 18.

Controller 82 accepts data and commands from buffer 81 and thereby controls function unit 85. When function unit 85 is not in operation and buffer 81 is not empty, i.e., buffer 81 is busy (BUFFER_BUSY is set), controller 82 sets the READ flag and accepts multiplexed data and commands (COMMAND) from buffer 81.

A parity check on each command (COMMAND) permits the presence or absence of errors to be detected prior to processing in function unit 85. When a parity error occurs in the part which indicates how many registers are to be scalar written into (the SC_W_LENGTH part of an OP CODE), the SC_W_LENGTH_ERROR flag is set because the scalar writing cannot be performed.

When a parity error occurs in another part of a command, the scalar write cannot be performed with correct values, in which case the P_ERROR flag is set. When no parity error occurs, but the op code part of a command is an undefined instruction, the UNDEF flag is set.

In sending an instruction to function unit 85, controller 85 outputs it on CNTL and sets the CNTL_VAL flag to indicate that the instruction is valid.

When function unit 85 is in operation or when the buffer is not empty and the BUSY flag is set, the controller sets the COPRO_BUSY flag, informing the CPU of the coprocessor being in operation. Thereby, the CPU is permitted to adjust the interruption timing.

Controller 82 may request scalar write unit 84 to perform a scalar write operation with dummy values when function unit 85 cannot scalar write properly; thus, the controller decodes SC_W_LENGTH indicating how many registers are to be scalar written into from OP CODE and outputs it to the scalar write unit.

Function unit 85 includes an arithmetic and logic unit and registers and operates as instructed by controller 82.

When the CNTL_VAL flag is set, control (CNTL) is valid and function unit 85 operates accordingly. To write into CPU registers (scalar write), resulting values to be written into are output onto RESULT and the RESULT_VAL flag is set to indicate that these values are valid.

When an exceptional event occurs, the EXCP flag is set which is output to exception unit 83. Exception unit 83 processes parity errors of data and commands accepted from the CPU and exceptions in the function unit.

The UNDEF flag being set indicates that an undefined instruction has been transferred. The P_ERROR flag being set indicates that a parity error has occurred. The F_UNIT_EXCP flag being set indicates that an exception is detected in function unit 85. In these cases, scalar writing with correct values is impossible; thus, scalar writing with dummy values is performed. That is, the DUMMY_WRITE flag is set to request the scalar write unit to perform scalar writing with dummy values. The EXCP flag is set to inform the CPU of the detection of an exceptional event.

It is when a parity error has occurred in the part indicating how many registers are to be scalar written into that the SC_W_LENGTH_ERROR flag is set.

In this case, since the scalar writing is quite impossible, the SVP flag is set to make a request to a service processor not shown for processing.

FIG. 10 shows an arrangement of the conventional exception unit. The UNDEF, P_ERROR and F_UNIT_EXCP flags are applied to an OR gate 115, which outputs the EXCP flag and the DUMMY_WRITE flag. The SC_W_LENGTH_ERROR flag is output as the SVP flag.

Coprocessor instructions include instructions to write into CPU registers (scalar writing). When the scalar writing is performed properly, outputs of function unit 85 are simply sent to the CPU as they are; otherwise, the scalar write unit has to perform the scalar writing.

FIG. 11 shows an arrangement of the conventional scalar write unit. A constant-value output circuit 116 outputs dummy data which substitutes for the RESULT output from function unit 85.

The RESULT and the dummy data are applied to a selector 117 which responds to the RESULT_VAL flag. When normal, i.e., when the RESULT_VAL flag is 1, the RESULT is selected, while, when abnormal, i.e., when the RESULT_VAL flag is 0, the DUMMY_DATA of the fixed data output circuit 116 is selected, then output as SC_W_DATA.

The RESULT_VAL is applied to an OR gate 118. When normal, the RESULT_VAL is output as SC_W_DATA_VAL through OR gate 118. When abnormal, the SC_W_DATA_VAL is not output a desired number of times. To output it, a presentable down counter 119 is provided.

As shown down counter 119 is presentable, down counter 119 is preset with the SC_W_LENGTH when the DUMMY_WRITE flag is set. The SC_W_DATA_VAL flag is made a 1 the number of times the counter is preset.

When the DUMMY_WRITE flag is not set, but the RESULT_VAL flag is set, the output RESULT of the function unit is valid. In this case, the RESULT_VAL is output as the SC_W_DATA_VAL and RESULT is output as the SC_W_DATA so that CPU registers are normally scalar written into. When the DUMMY WRITE flag is set, scalar writing with dummy values is performed. In this case, the SC_W_DATA_VAL flag is set the number of times given in the SC_W_LENGTH information as to how many registers are to be scalar written into. Dummy data is output onto the SC_W_DATA line.

The above configuration permits the processor to control the coprocessor to perform special arithmetic operations at high speed.

The above-described coprocessor fetches data and commands from its instruction buffer for execution. However, it is impossible for the coprocessor to output, i.e., scalar write, data the CPU actually requires in the following cases:

(1) where an interruption is generated within the coprocessor and it is thus required to stop the execution by the coprocessor so that control based on interruption processing in CPU 18 is performed;

(2) where the coprocessor receives wrong data and commands due to hardware errors in the CPU or undefined commands; and (3) where processing to be performed by the coprocessor is indefinite or the amount of data to be output by the coprocessor is unknown.

In such cases, if the coprocessor outputs no data and the writing into CPU registers to be written into by the coprocessor is not performed, then the scoreboard bits corresponding to the registers will not be reset.

FIG. 12 is a diagram for use in explanation of program execution. When a preceding instruction for coprocessor 19 is decoded and then executed, a 1 is set on the scoreboard by a scoreboard operation. The succeeding instruction is thus forced to wait until the scoreboard is reset. That is, since a 1 is set on the scoreboard, the succeeding instruction is always placed in the wait state as the result of reference to the scoreboard. Suppose that the execution of the preceding instruction is actually stopped. Then, the scoreboard must be reset to 0 at the point of X. In the event that the scoreboard is not reset, however, the wait state will continue.

In the above cases (1) and (2), although it is impossible for the coprocessor to output values that CPU 18 actually requires, the amount of data required by the CPU is known. If, therefore, the coprocessor outputs to the CPU dummy data in place of values that the CPU actually requires, then the CPU will accept data and write it into a register. Thereby, the scoreboard bit corresponding to that register is reset, permitting the continuation of interruption processing execution.

In contrast, in the case (3) where the amount of output data of the coprocessor is unknown, dummy write cannot be performed. In this case, after the execution is stopped, the processing must be resumed by intervention by the service processor. The intervention by the service processor requires management of time since hang-up, which requires an appreciable amount of time.

A coprocessor instruction is an instruction, decoded by CPU 18, to transfer commands/data to coprocessor 19. This coprocessor instruction comprises information sufficient for only the CPU to recognize (information as to whether that instruction is a coprocessor instruction or not, the numbers of registers to be scalar written into, the numbers of CPU registers to be read from, etc.), information sufficient for only the coprocessor to recognize (the type of an arithmetic operation to be performed by the coprocessor and the number of registers to be read from and written into by the coprocessor), and information both the CPU and the coprocessor must recognize (the number of transfers of commands/data from the CPU to the coprocessor, whether CPU registers are to be written into and read from or not, and how many CPU registers are to be read from and written into).

Several types of coprocessors are connectable to CPU 18. The coprocessor instruction formats vary among the types of coprocessors. It is therefore difficult for the CPU and the coprocessor to obtain the above three types of information from the same field of an instruction. For this reason, information which must be recognized by the CPU and the coprocessor is encoded in two separate fields for the CPU and the coprocessor.

If, therefore, a mismatch occurs for some reason between the field for the CPU and the field for the coprocessor in the information that must be recognized by both of them and consequently the number of registers to be scalar written into by the coprocessor becomes smaller than the number of registers that the CPU intends, then hang-up would result.

When the CPU and the coprocessor cannot detect any error, the program execution will be continued. At a stage of execution of an instruction to read from or write into a register to be scalar written into, if that register will not be written into after however long a wait regardless of the scoreboard having been set, the instruction cannot be executed and hang-up will result because the scoreboard is not reset. In such a situation as well, the processing is resumed by intervention by the service processor. However, a long time will be required for the service processor to intervene.

SUMMARY OF THE INVENTION

The present invention is directed to an information processing device comprising a CPU which issues coprocessor instructions for coprocessor processing operations and a coprocessor which executes the coprocessor instructions from the CPU and writes the results into CPU registers.

It is an object of the present invention to provide an information processing device which permits abnormality to be detected exactly even if the amount of data to be output from the coprocessor is unknown and an information mismatch occurs between the CPU and the coprocessor.

In principle, the present invention is arranged such that one processor, either the CPU or the coprocessor, is provided with abnormality decision unit which makes a decision as to whether abnormality has occurred on the basis of signals transmitted from the other processor, and the other processor is provided with transmission unit which transmits the signals to the one processor at the start of processing or at the time of detection of abnormality.

A first embodiment of the present invention is arranged such that the coprocessor is provided with abnormality detecting unit which detects abnormality of undefined coprocessor instructions and/or execution errors and flag-off unit which, when abnormality is detected, turns off a flag indicating that processing is being performed.

That is, on the occurrence of abnormality, although information obtained by coprocessor instructions has been written into registers in the CPU, that flag is turned off. This contradiction permits the CPU to see that abnormality has occurred.

A second embodiment of the present invention is further provided with flag-on unit which, when abnormality is detected, turns on a flag indicating that a buffer in the coprocessor is full.

That is, on the occurrence of abnormality, the coprocessor turns off the flag indicating that processing is being performed and turns on the flag indicating that the buffer is full. Normally such flag states cannot exist. Thereby, the CPU is permitted to see that abnormality has occurred.

A third embodiment of the present invention is arranged such that the CPU is provided with transfer unit which, when the CPU issues a coprocessor instruction, transfers to the coprocessor information about the number of CPU registers to be written into by the coprocessor for that coprocessor instruction, and the coprocessor is provided with compare unit which makes a comparison between the number of CPU registers to be written into obtained by the coprocessor for that coprocessor instruction and the number of CPU registers transferred to the coprocessor by the transfer unit.

That is, when the comparison indicates inequality, the coprocessor is permitted to see that abnormality has occurred.

DETAILED DESCRIPTION OF THE PREFERRED EMBODIMENTS

Figure 1:
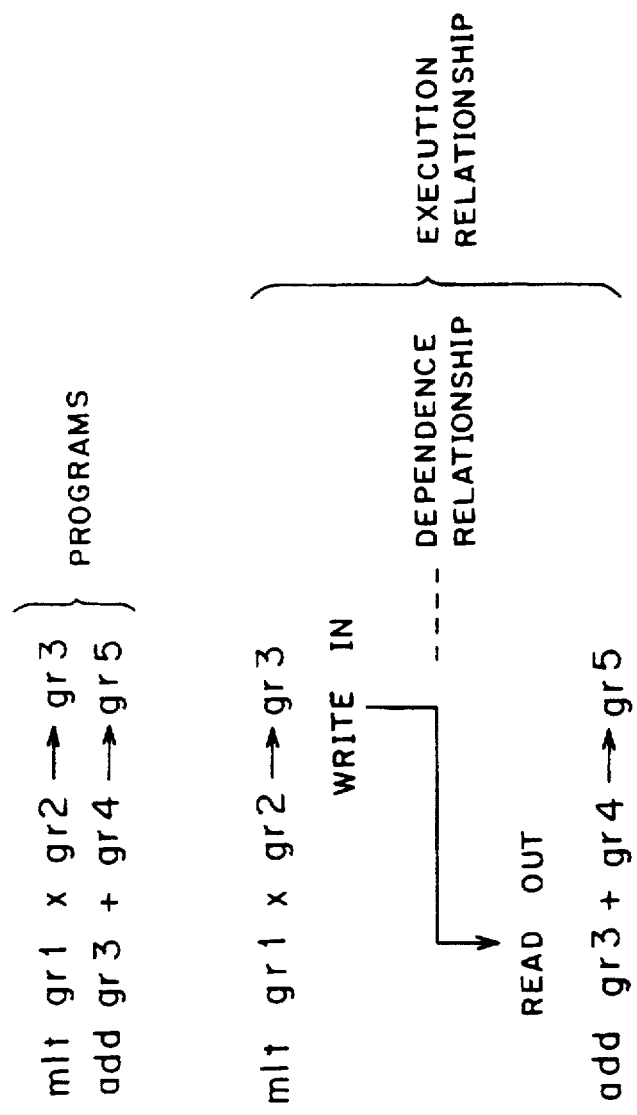
FIG. 1 is a diagram for use in explanation of programs and execution thereof.
Figure 2:
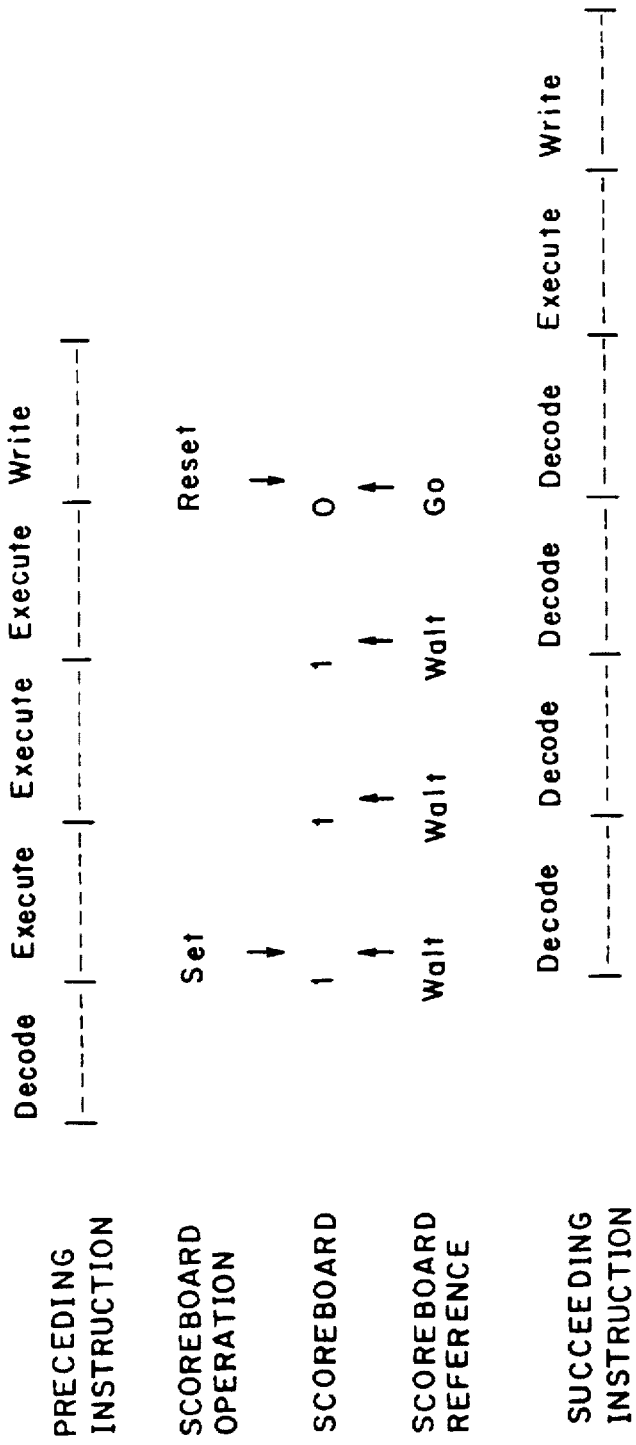
FIG. 2 is a diagram for use in explanation of normal execution of programs.
Figure 3:
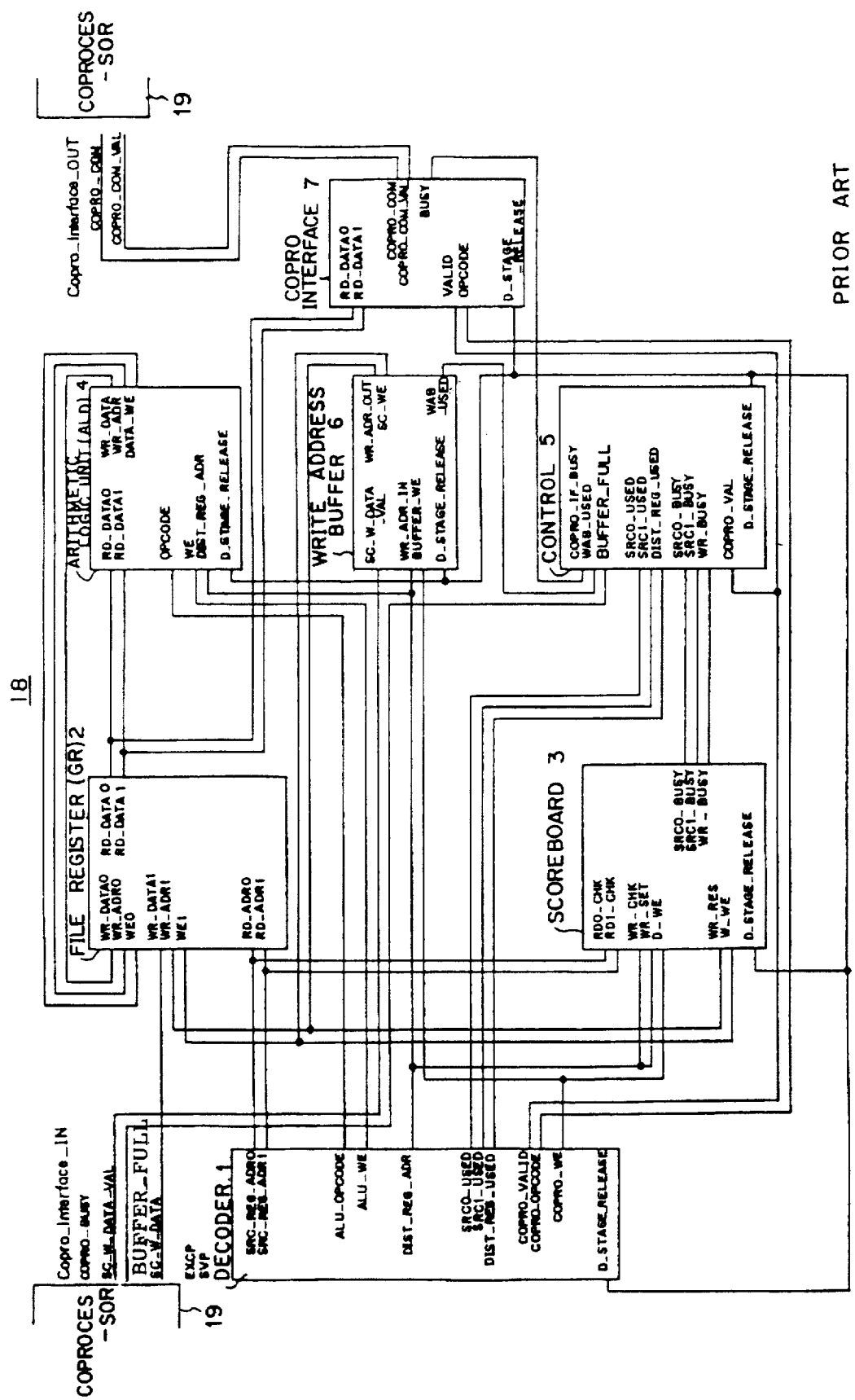
FIG. 3 shows an arrangement of a conventional CPU.
Figure 4:
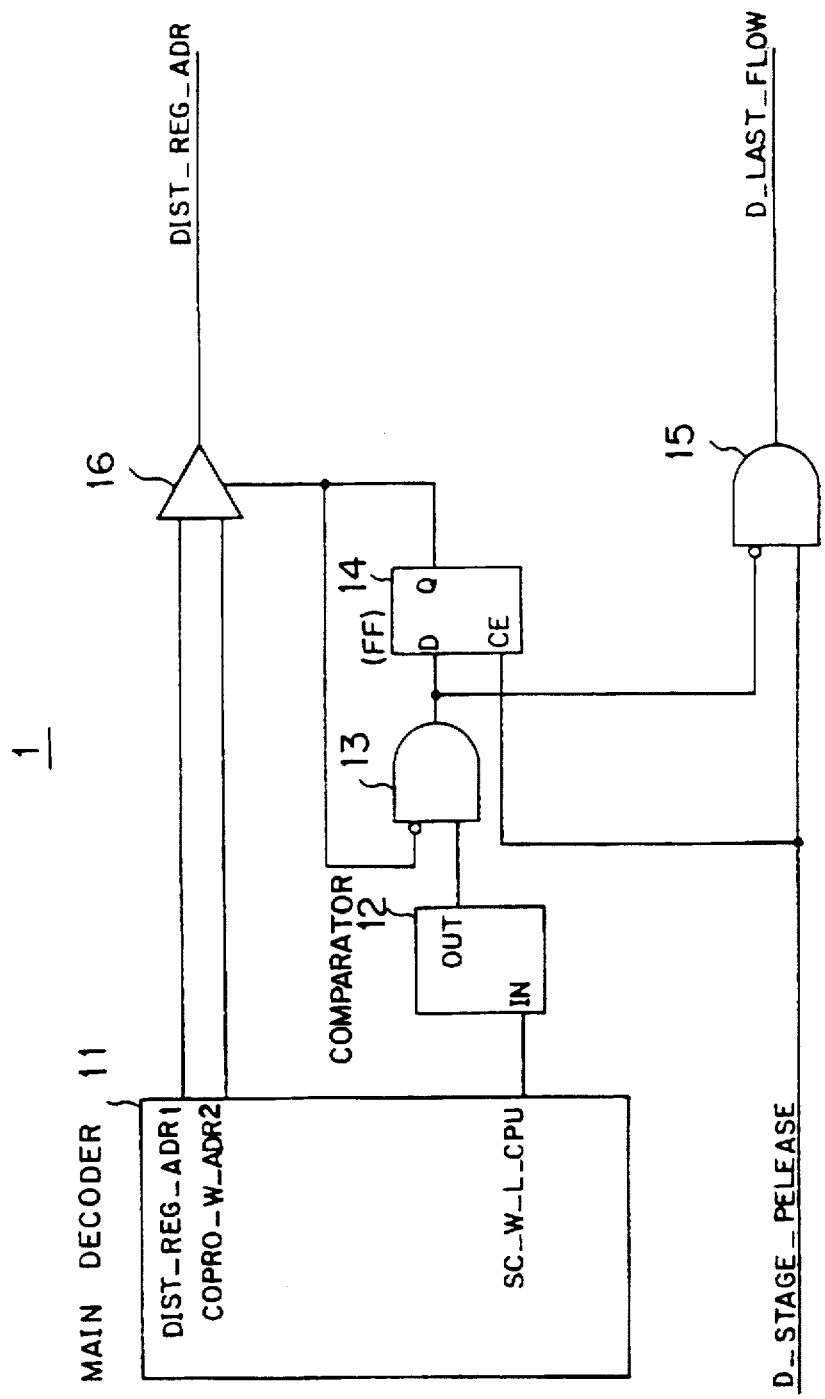
FIG. 4 shows an arrangement of the decoder in FIG. 3.
Figure 5:
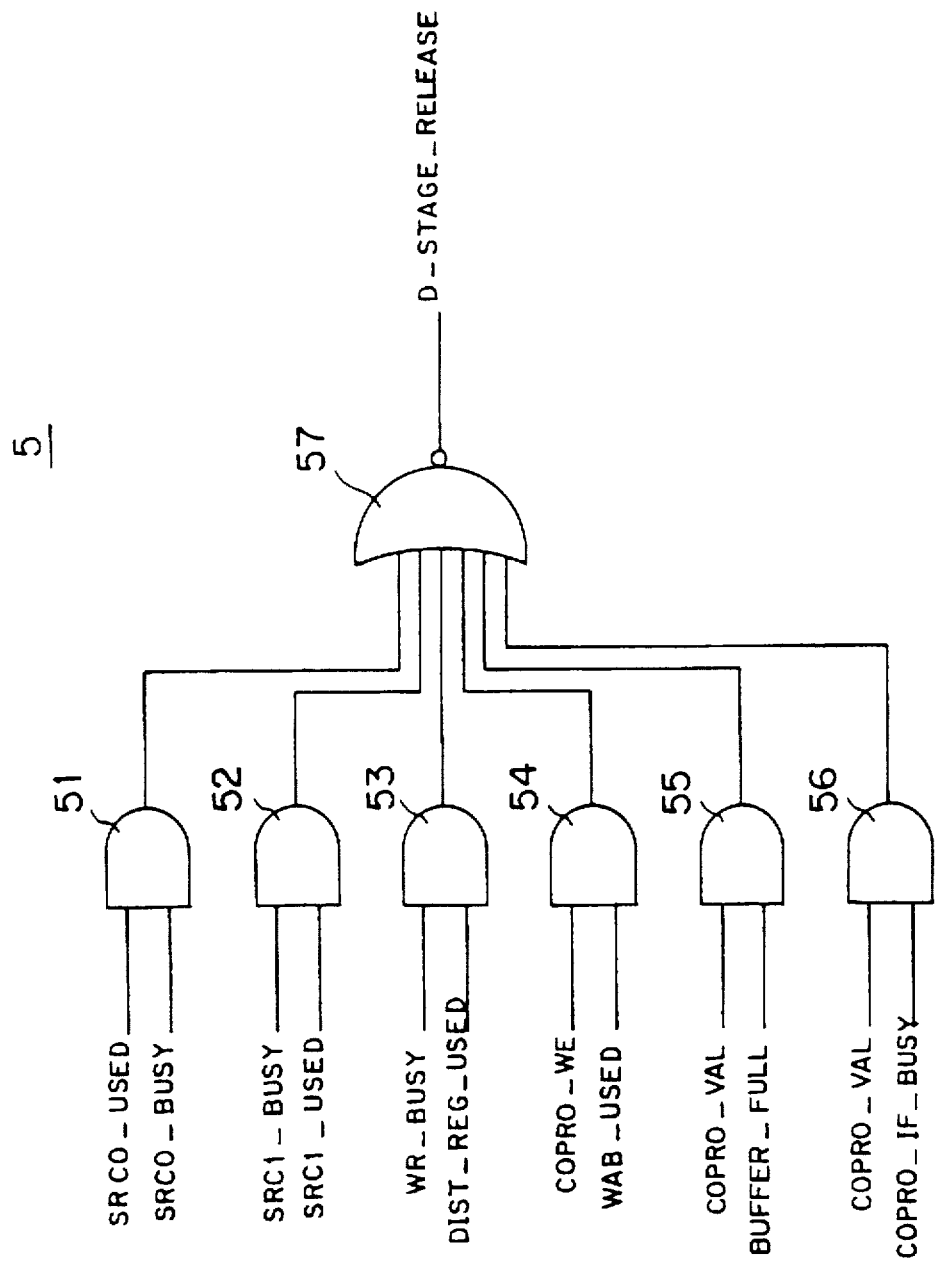
FIG. 5 shows an arrangement of the controller in FIG. 3.
Figure 6:
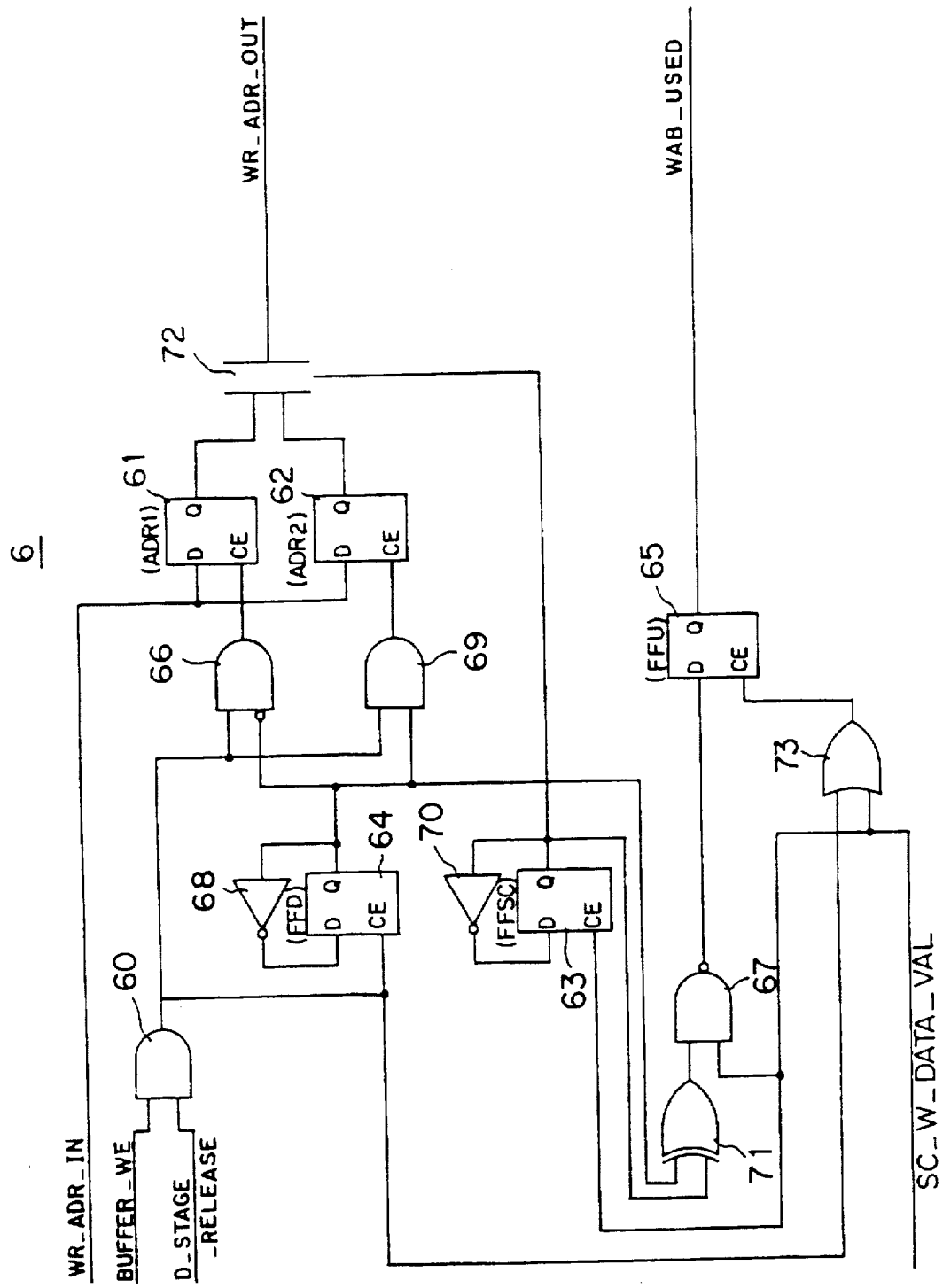
FIG. 6 shows an arrangement of the write address buffer in FIG. 3.
Figure 7:
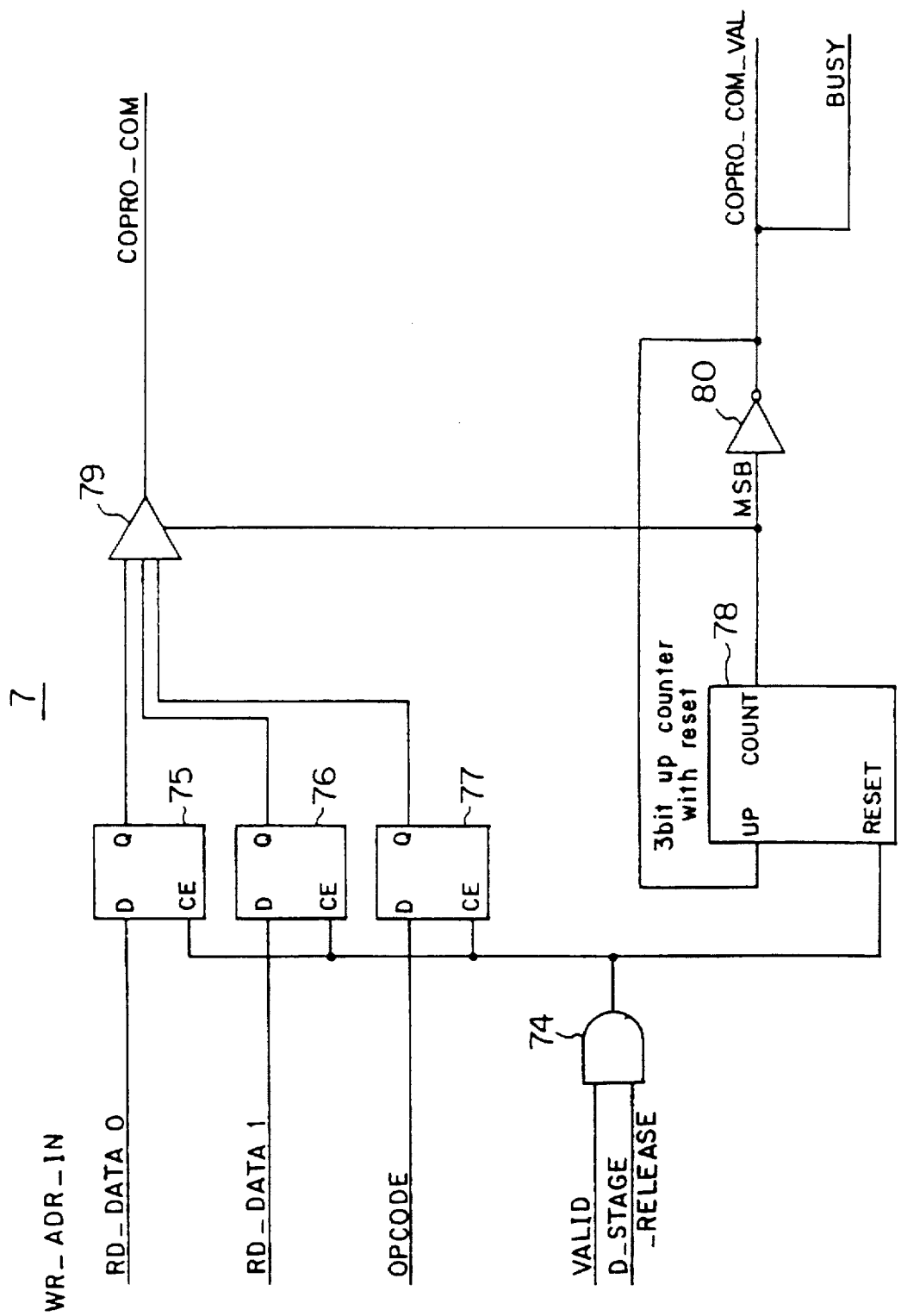
FIG. 7 shows an arrangement of the copro interface in FIG. 3.
Figure 8:
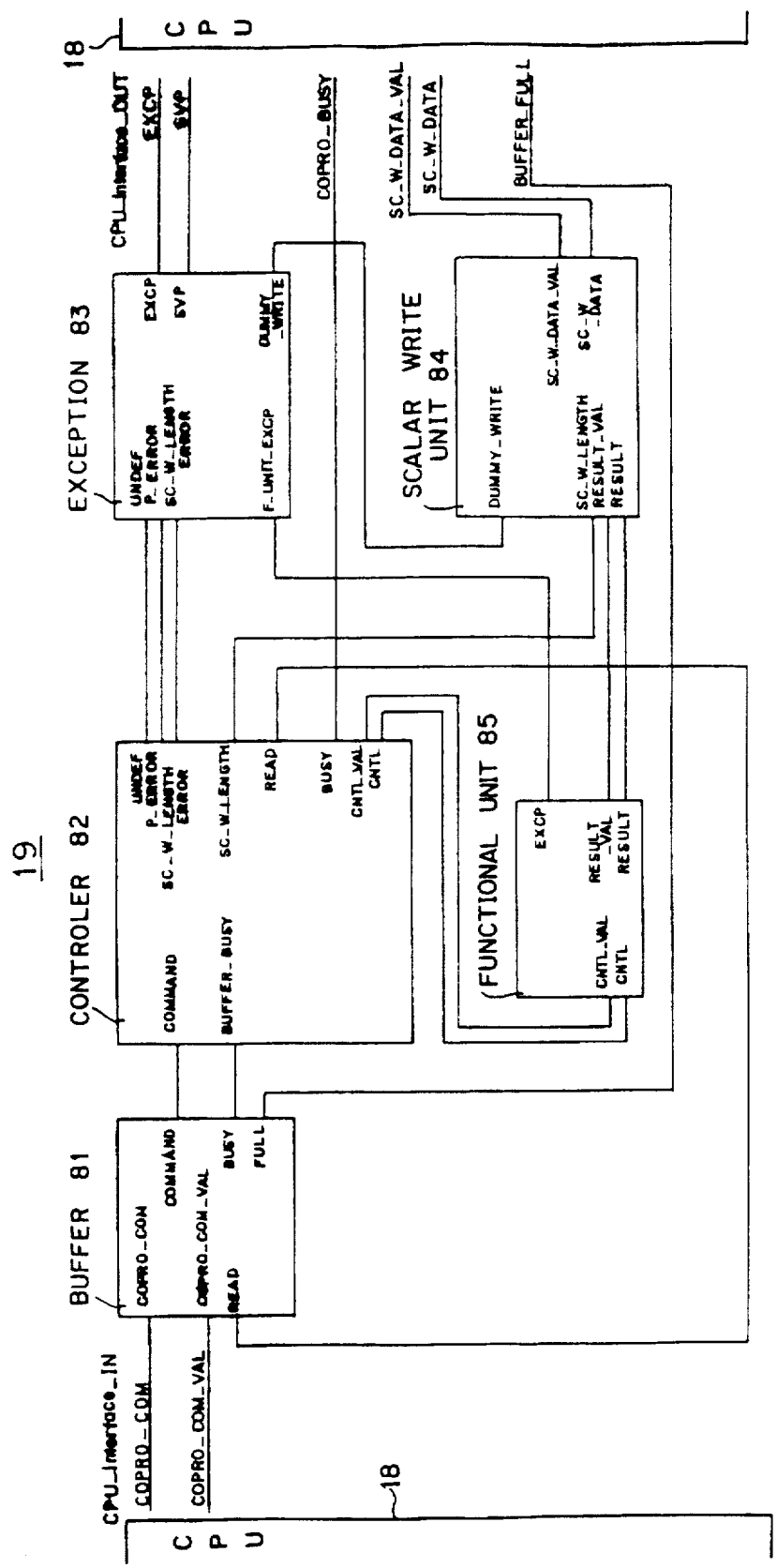
FIG. 8 shows an arrangement of the coprocessor in FIG. 3.
Figure 9:
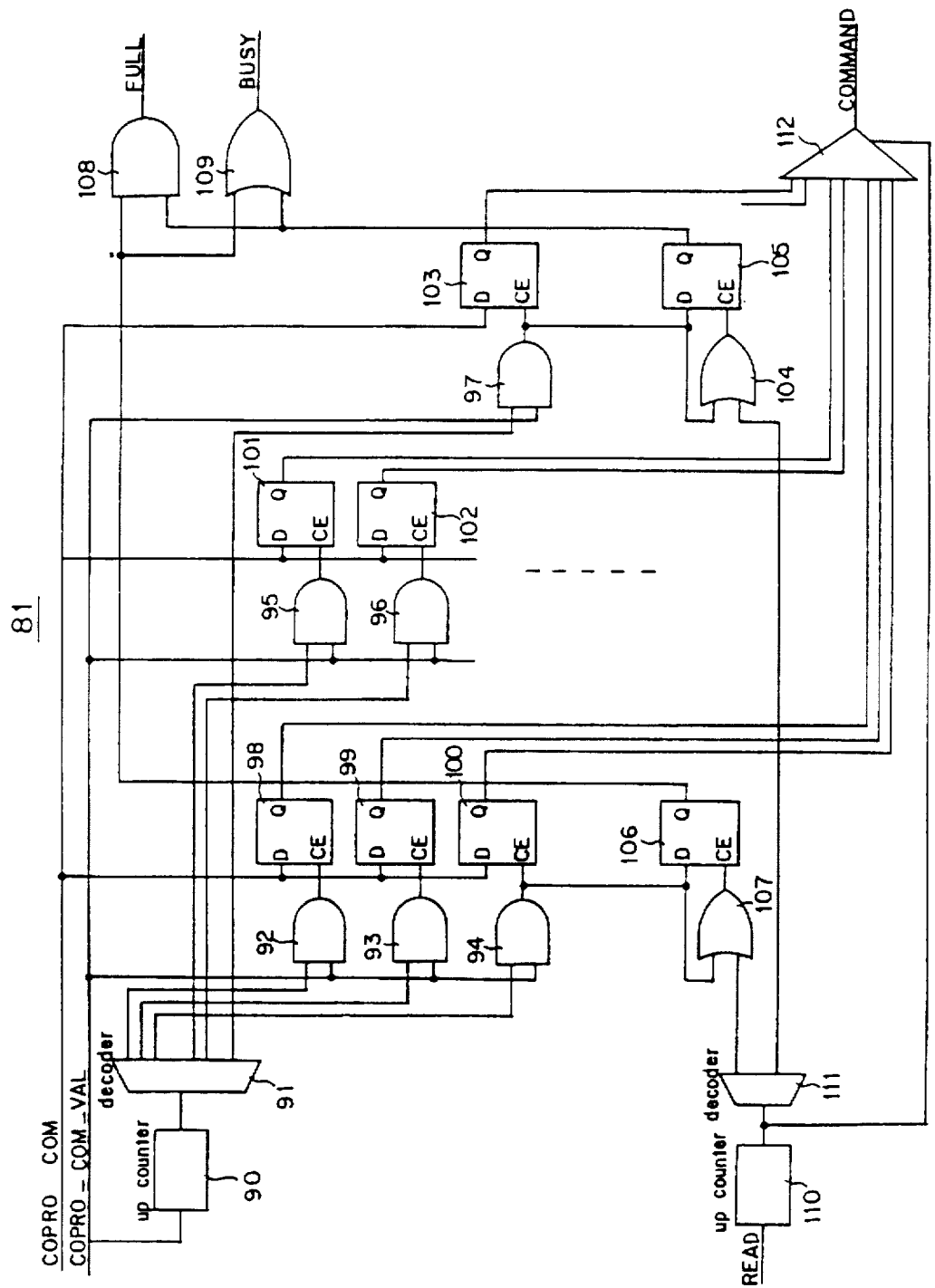
FIG. 9 shows an arrangement of the buffer in FIG.8.
Figure 10:
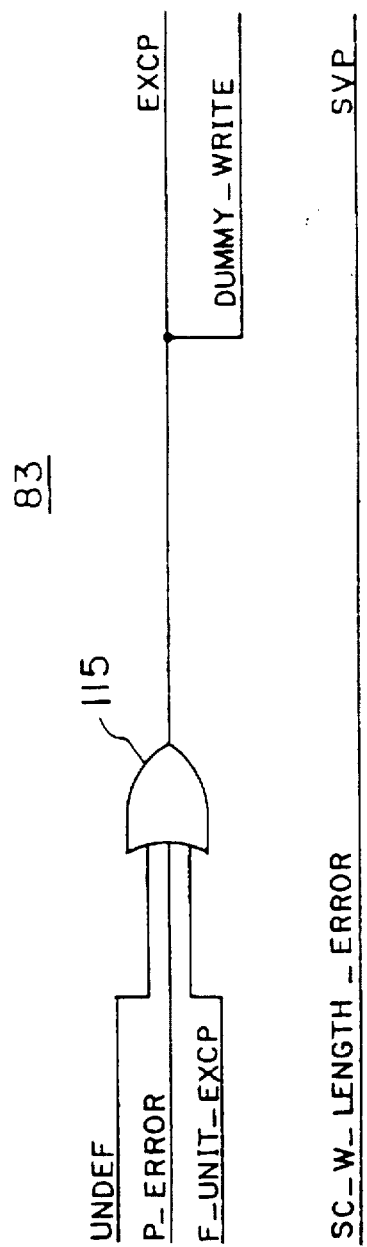
FIG. 10 shows an arrangement of the exception unit in FIG. 3.
Figure 11:
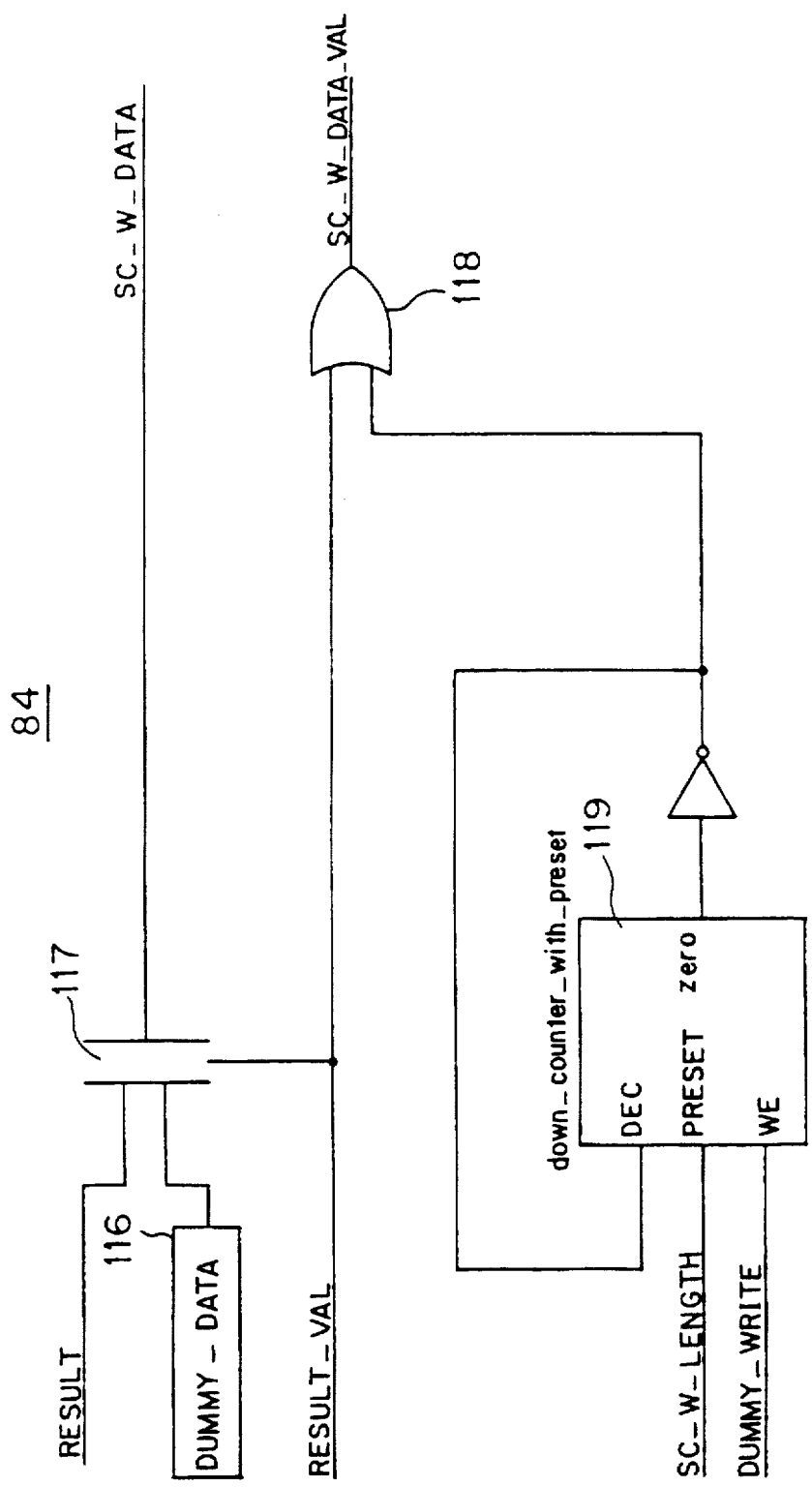
FIG. 11 shows an arrangement of the scalar write unit in FIG. 3.
Figure 12:
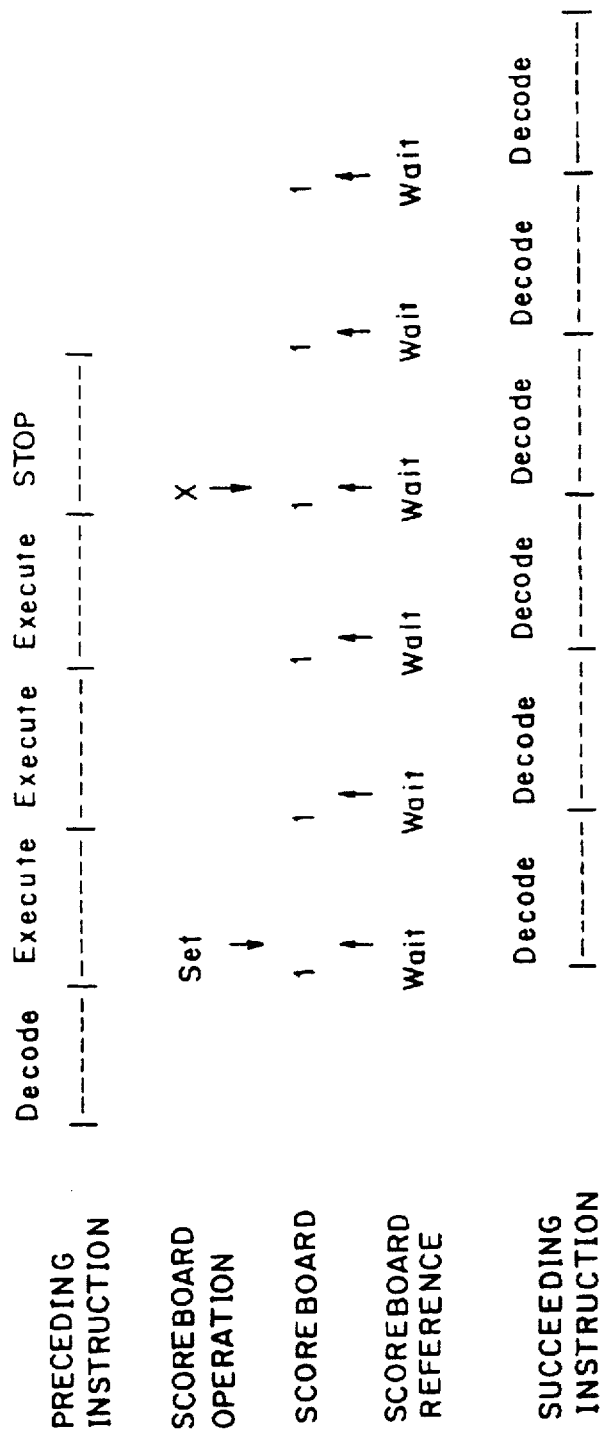
FIG. 12 is a diagram for use in explanation of abnormal program execution.
Figure 13:
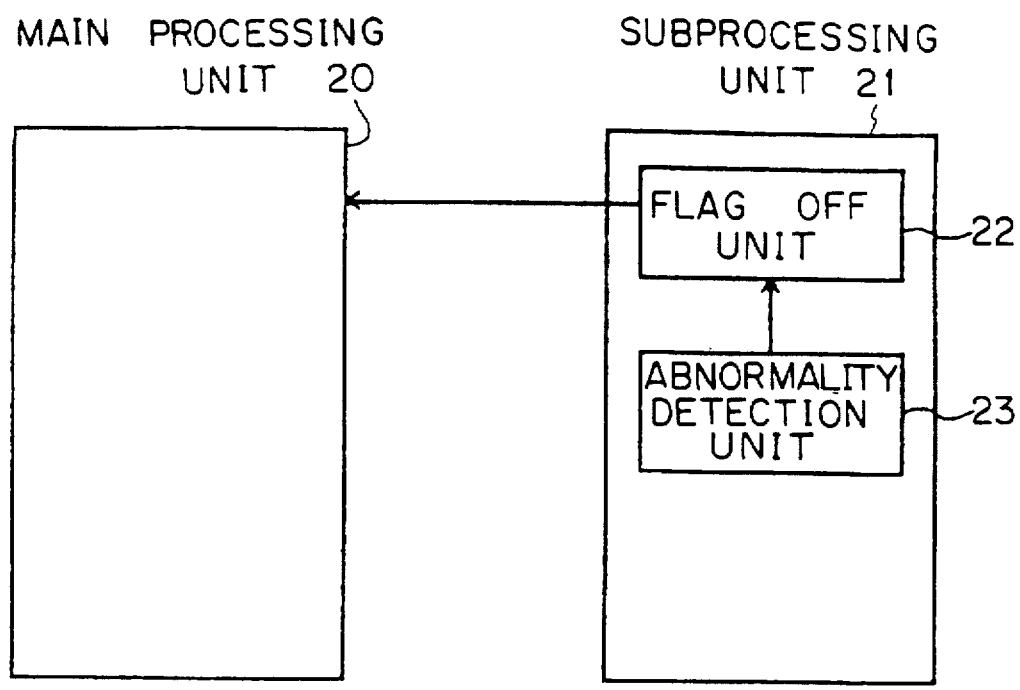
FIG. 13 shows a first basic arrangement of the present invention.
Figure 14:
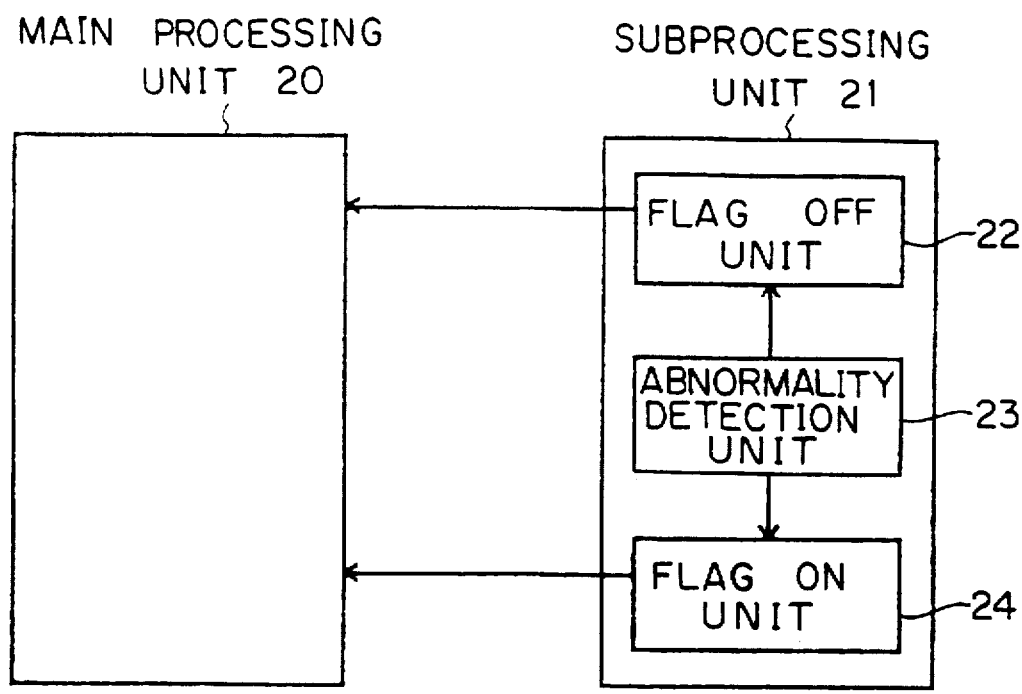
FIG. 14 shows a second basic arrangement of the present invention.
Figure 15:
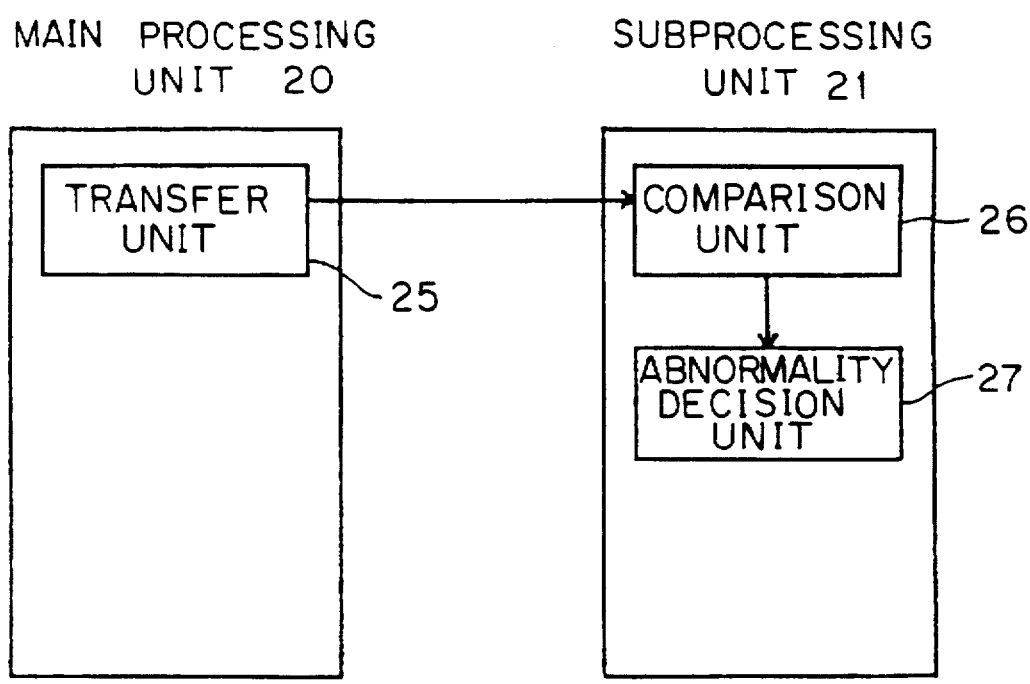
FIG. 15 shows a third basic arrangement of the present invention.

Referring to FIGS. 13, 14 and 15, there are shown first, second and third features of the present invention.

The present invention is directed to a system which comprises a main processing unit 20 and a subprocessing unit 21. The main processing unit issues instructions to the subprocessing unit to direct it to perform processing operations. The subprocessing unit performs the processing operations and writes the results into registers in the main processing unit. For instance, the main processing unit is a CPU and the subprocessing unit is a coprocessor.

According to the first feature shown in FIG. 13, the present invention equips the subprocessing unit 21 with an abnormality detection unit 23 which detects that a subprocessing unit instruction is undefined and/or execution errors have occurred and a flag-off unit 22 which turns off a flag indicating that the coprocessor is in operation upon detection of abnormality.

According to the second feature shown in FIG. 14, in addition to abnormality detection unit 23 and flag-off unit 22 in the first feature the subprocessing unit is further equipped with a flag-on unit 24 which turns on a flag indicating that a buffer in the subprocessing unit is full.

According to the third feature shown in FIG. 15, main processing unit 20 is equipped with a transfer unit 25 which, when a subprocessing unit instruction is issued, transfers information as to how many registers in the main processing unit are to be written into by that instruction to subprocessing unit 21, and subprocessing unit 21 is equipped with a comparison unit 26 which makes a comparison between the number of registers in the main processing unit which are to be written into by the instruction and the number of registers indicated by that information transferred by the transfer unit and an abnormality decision unit 27 which, when the comparison indicates inequality, decides that abnormality has occurred.

In the first feature of the present invention, when abnormality is detected by abnormality detection unit 23, the flag indicating that the coprocessor is active is turned off by flag-off unit 22. This permits main processing unit 20 to decide that abnormality has occurred though registers to be written into remain.

In the second feature of the present invention, main processing unit 20 considers a state where the flag indicating the coprocessor is active is off and the flag indicating that the buffer is full is on to be abnormal because such a state cannot exist.

In the third feature of the present invention, information as to how many registers are to be used is transferred from main processing unit 20 to subprocessing unit 21, and a comparison between the number of registers to be used and the number of main processing unit registers to be written into by a subprocessing unit instruction is made in comparison unit 26. When the comparison indicates inequality, abnormality decision unit 27 decides that abnormality has occurred. By receiving notification of the occurrence of this abnormality, the main processing unit can also decide that abnormality has occurred.

Even when an instruction mismatch occurs between main processing unit 20 and subprocessing unit 21, abnormality can be detected exactly, preventing hang-up and reducing CPU down-time significantly.

In the first and second features of the present invention, both the coprocessor and the CPU cannot detect any error until the instruction buffer in the coprocessor becomes empty and hence the program execution is continued. It is not until it is found that the write address buffer will not be emptied even if the coprocessor instruction buffer has become empty and the COPRO_BUFFER flag has then be reset that the CPU detects that no scalar writing has been performed and resets the scoreboard. However, since the CPU cannot detect that no scalar writing has been performed until the COPRO_BUSY flag is reset, recovery from errors will be delayed.

This problem can be solved by the third feature of the present invention in which a comparison is made between the number of registers to be scalar written into that the CPU expects and the number of registers that the coprocessor actually writes into.

Hereinafter, the preferred embodiments of the present invention will be described with reference to the accompanying drawings.

Figure 16:
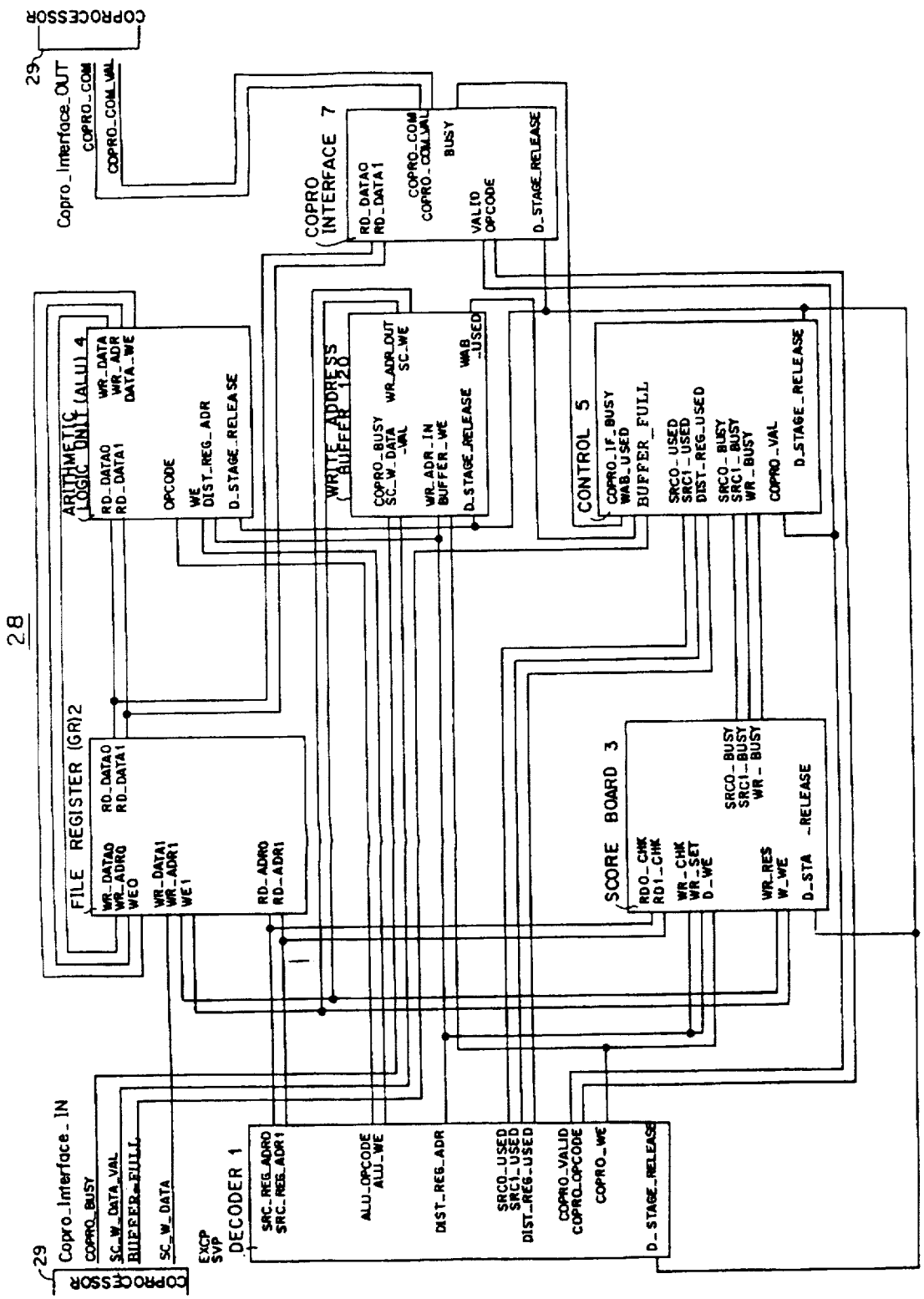
FIG. 16 shows an arrangement of a CPU according to a first embodiment of the present invention.

FIG. 16 shows an arrangement of CPU 28 according to a first embodiment of the present invention. Like reference numerals are used to denote corresponding circuits to those in the conventional CPU and their description will be omitted.

In the first embodiment of the present invention, CPU 28 can see from a COPRO_BUSY signal whether the coprocessor is in operation or not. If the coprocessor is in operation, the possibility exists that a scalar write operation may be performed later. If not in operation, there is no such possibility. In the CPU, a WAB_USED flag of write address buffer 120 can be used to see if there is a register that is waiting to be scalar written into. To obtain this state, the COPRO_BUSY signal is applied from the coprocessor to write address buffer 120.

When the WAB_USED flag is true, i.e., 1 and the COPRO_BUSY flag is not true, i.e., 0, this state indicates that there is a register that is waiting to be scalar written into, but there is no possibility for that register to be scalar written into by the coprocessor. By detecting the state, the CPU can seen that abnormality has occurred.

Figure 17:
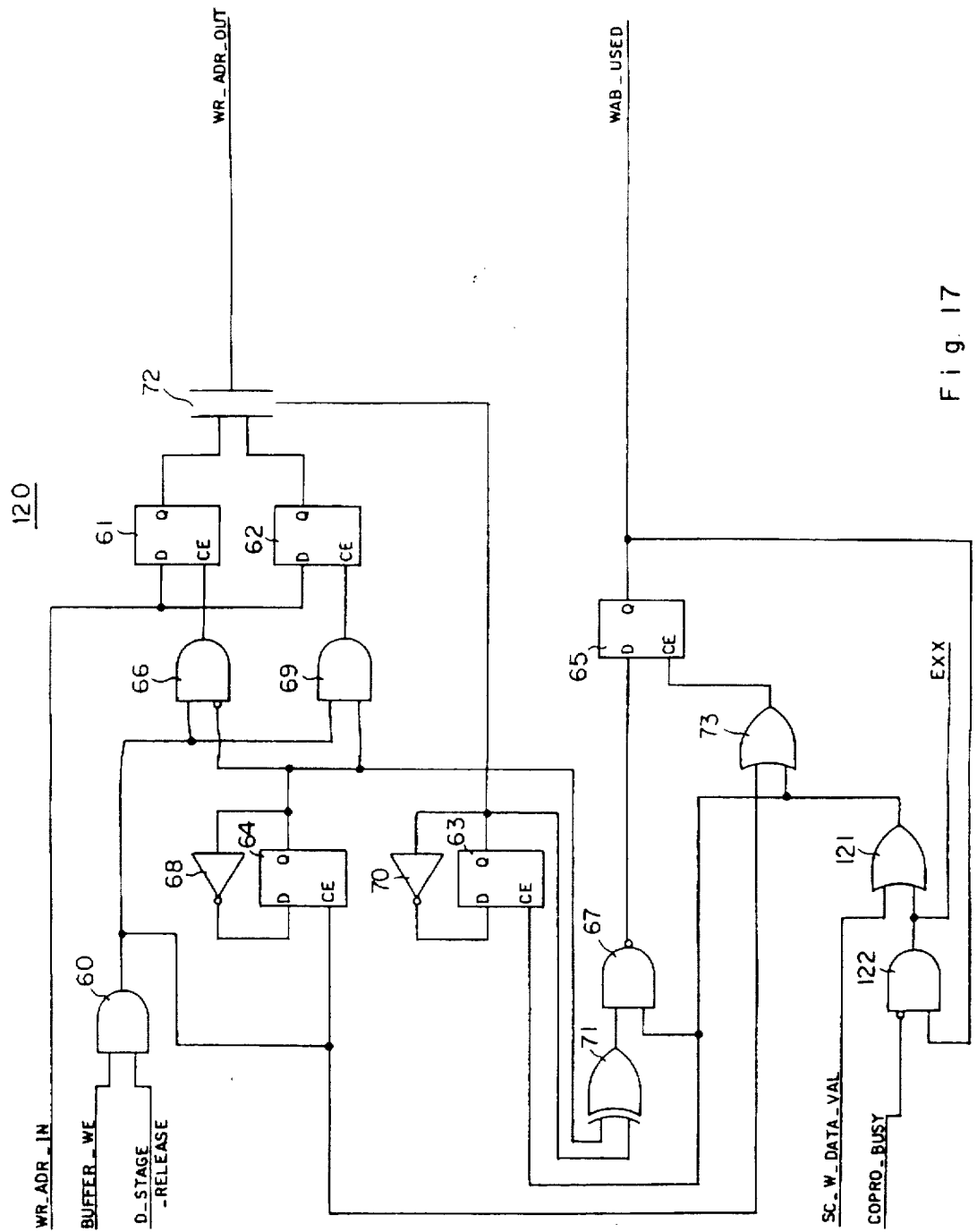
FIG. 17 shows an arrangement of the write address buffer in FIG. 16.

FIG. 17 shows an arrangement of write address buffer 120 of FIG. 16. Although, in the prior art, the SC_W_DATA_VAL flag is directly applied to OR gate 73, in the first embodiment of the present invention, it is applied to OR gate 121 where it is ORed with the output of AND gate 122. AND gate 122 has its inversion input connected to the COPRO_BUSY and its non-inversion input connected to the WAB_

USED. The output of this AND gate, EXX, is used in the CPU as an abnormality signal.

Figure 18:
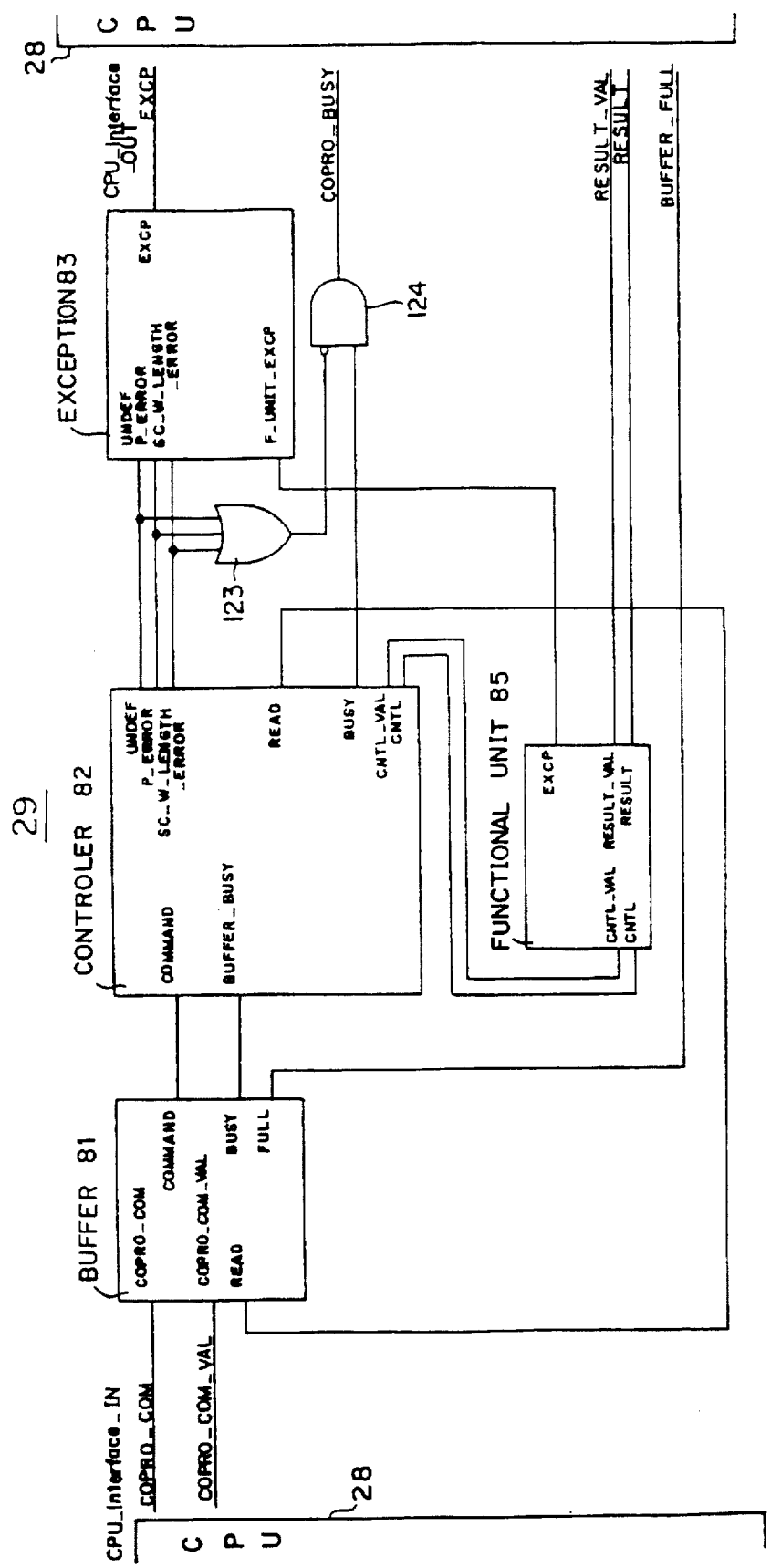
FIG. 18 shows an arrangement of a coprocessor for use with the CPU 16 of FIG. 16.

FIG. 18 shows an arrangement of coprocessor 29 in the first embodiment of the present invention. This coprocessor is distinct from the conventional coprocessor in that an OR gate 123 and an AND gate 124 are provided. More specifically, OR gate 123 have its three inputs connected to UNDEF, P_ERROR, and SC_W_LENGTH_ERROR, and AND gate 124 has its inversion input connected to the output of OR gate 123 and its non-inversion input connected to the BUSY flag from controller 82.

In the prior art, the BUSY flag is output as the COPRO_BUSY flag. In the first embodiment of the present invention, the COPRO_BUSY flag is set only when the UNDEF, P_ERROR and SC_W_LENGTH_ERROR flags are all 0s and the BUSY flag from controller 82 is a 1. For example, when at least one of the UNDEF, P_ERROR and SC_W_LENGTH_ERROR flags goes to a 1, the output of OR gate 123 goes to a 1, which turns AND gate 124 off. That is, the COPRO_BUSY flag is made a 0.

Although controller 82 is outputting the BUSY flag at 1, the COPRO_BUSY flag is reset to 0 on the occurrence of an error. The other operations are the same as those in the prior art. When the COPRO_BUSY flag is reset to 0, the output EXX of AND gate 122 on the CPU side goes to a 1, indicating the occurrence of abnormality.

According to the first embodiment of the present invention, as described above, abnormality can be recognized exactly without being hung-up by merely adding simple circuitry to CPU 28, for example, by merely adding simple logic to the write address buffer in the CPU. As a result, the conventional hardware adapted to request the service processor for processing can be removed. That is, the prior need of alerting the service processor of inexecutable scalar writing is eliminated.

Figure 19:
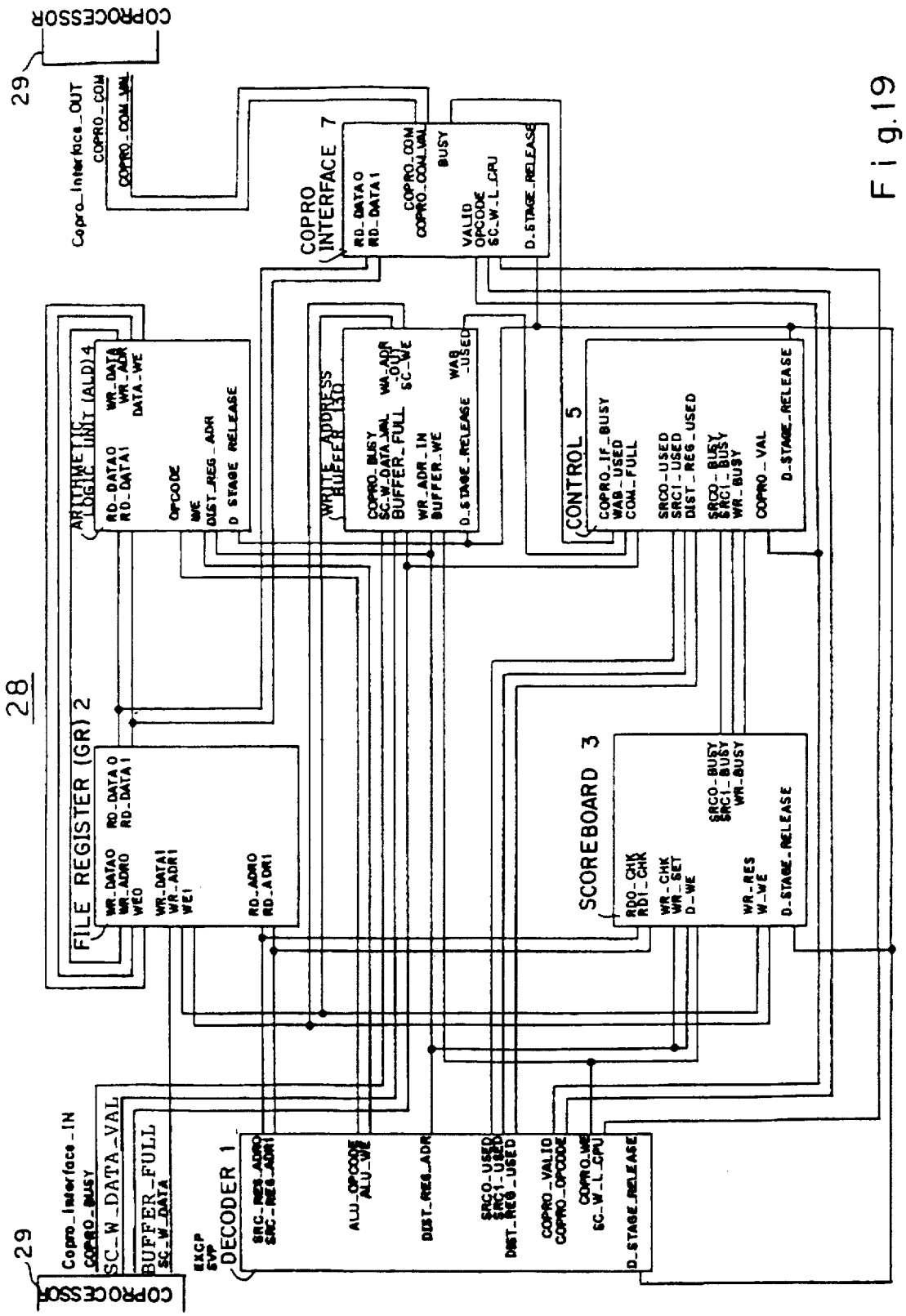
FIG. 19 shows an arrangement of a CPU according to a second embodiment of the present invention.

FIG. 19 shows an arrangement of CPU 28 according to a second embodiment of the present invention. Although, in the first embodiment, the COPRO_BUSY flag is made a 0 to indicate that abnormality has occurred, in the second embodiment, abnormality is recognized when the COPRO_BUSY flag is 1 and the BUFFER_FULL is 1. Consequently, the COPRO_BUSY and BUFFER_FULL flags are applied to write address buffer 130 in CPU 28.

As with the first embodiment, in the second embodiment as well, information as to how many registers are to be scalar written into, i.e., SC_W_LENGTH, may be lost on the coprocessor side because of transfer errors. Even if the SC_W_LENGTH information is lost during CPU-to-coprocessor communication, that information remains in the write address buffer in the CPU. As with the first embodiment, in the second embodiment as well, therefore, the coprocessor alerts the CPU to the event that no scalar writing is performed, permitting the CPU to use the write address buffer.

In the second embodiment, when coprocessor 29 cannot scalar write normal data because of the occurrence of an exception, the coprocessor alerts the CPU of impossibility of scalar writing so that the CPU can reset the scoreboard. This communication is made by the use of the COPRO_BUSY and BUFFER_FULL signal lines extending from coprocessor 29 to CPU 28. A state where the COPRO_BUSY is 0 and the BUFFER_FULL is 1 indicates that the coprocessor is not active and the buffer 81 is full of coprocessor instructions. This state normally cannot exist. When alerted to the state, CPU 28 judges that no scalar writing is performed.

The CPU 28 according to the second embodiment of the present invention is provided with write address buffer 130. When the CPU is alerted by the coprocessor to that no scalar writing can be performed, that is, when COPRO_BUSY=0 and BUFFER_FULL=1, all the scoreboard bits indicated by valid entries of the buffers within the write address buffer are reset. Also, the WAB_USED is made a 0. Thereby, the next instruction can be executed.

Figure 20:
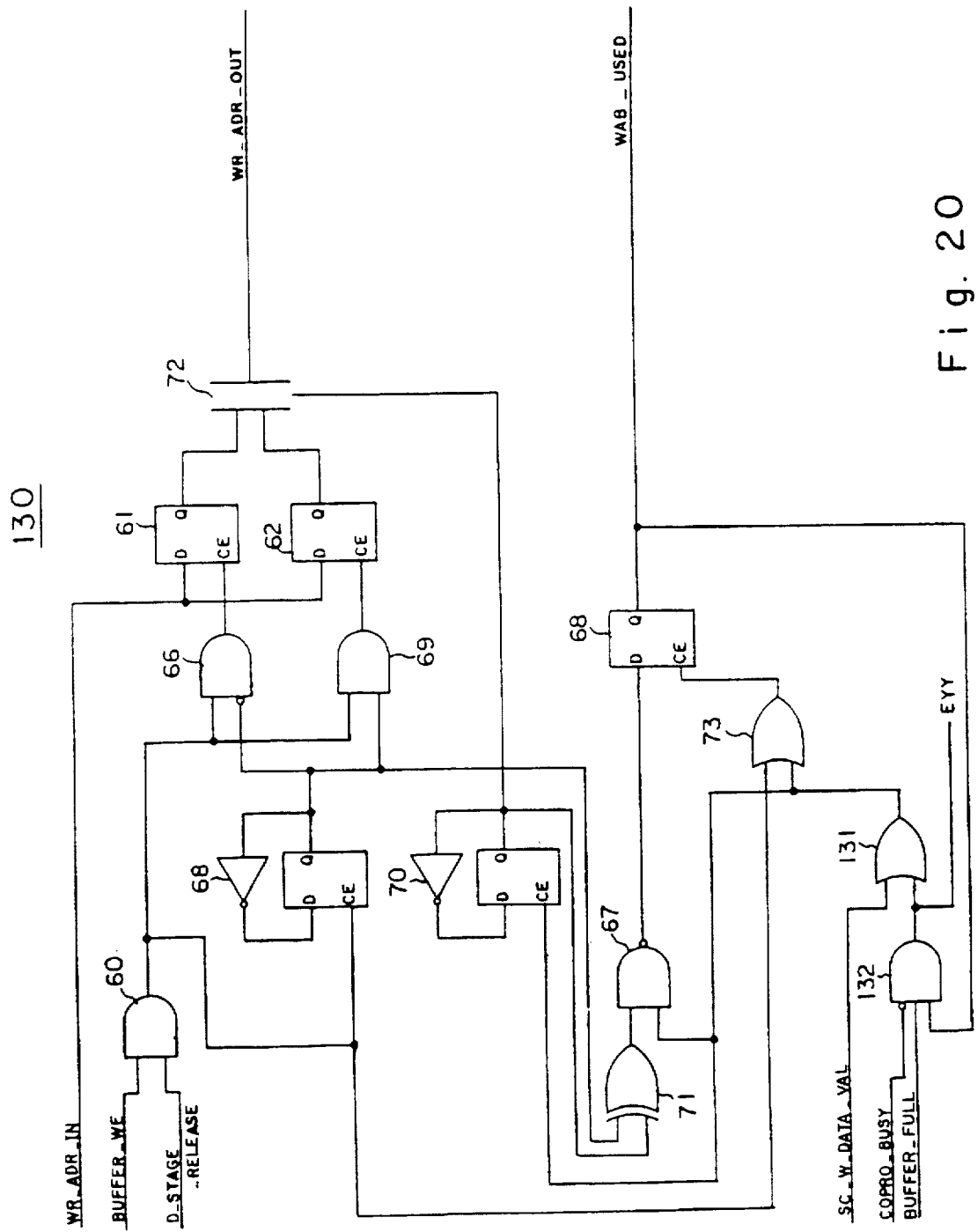
FIG. 20 shows an arrangement of the write address buffer in FIG. 19.

FIG. 20 shows an arrangement of the write address buffer shown in FIG. 19. Unlike the prior art, there are provided an AND gate 132 and an OR gate 131. AND gate 132 has its two non-inversion inputs connected to the WAB_USED and the BUFFER_FULL and its inversion input connected to the COPRO_BUSY, and OR gate 131 has its two inputs connected to the output of AND gate 132 and the SC_W_DATA_VAL. When COPRO_BUSY=0 and BUFFER_FULL value=1 and WAB_USED value is 1, AND gate 132 outputs an output signal EYY at 1, indicating that no scalar writing operation is performed. The output signal EYY clears buffers within the write address buffer. This signal serves as an error processing instruction signal within the CPU. The other circuits are the same as those in the prior art.

Figure 21:
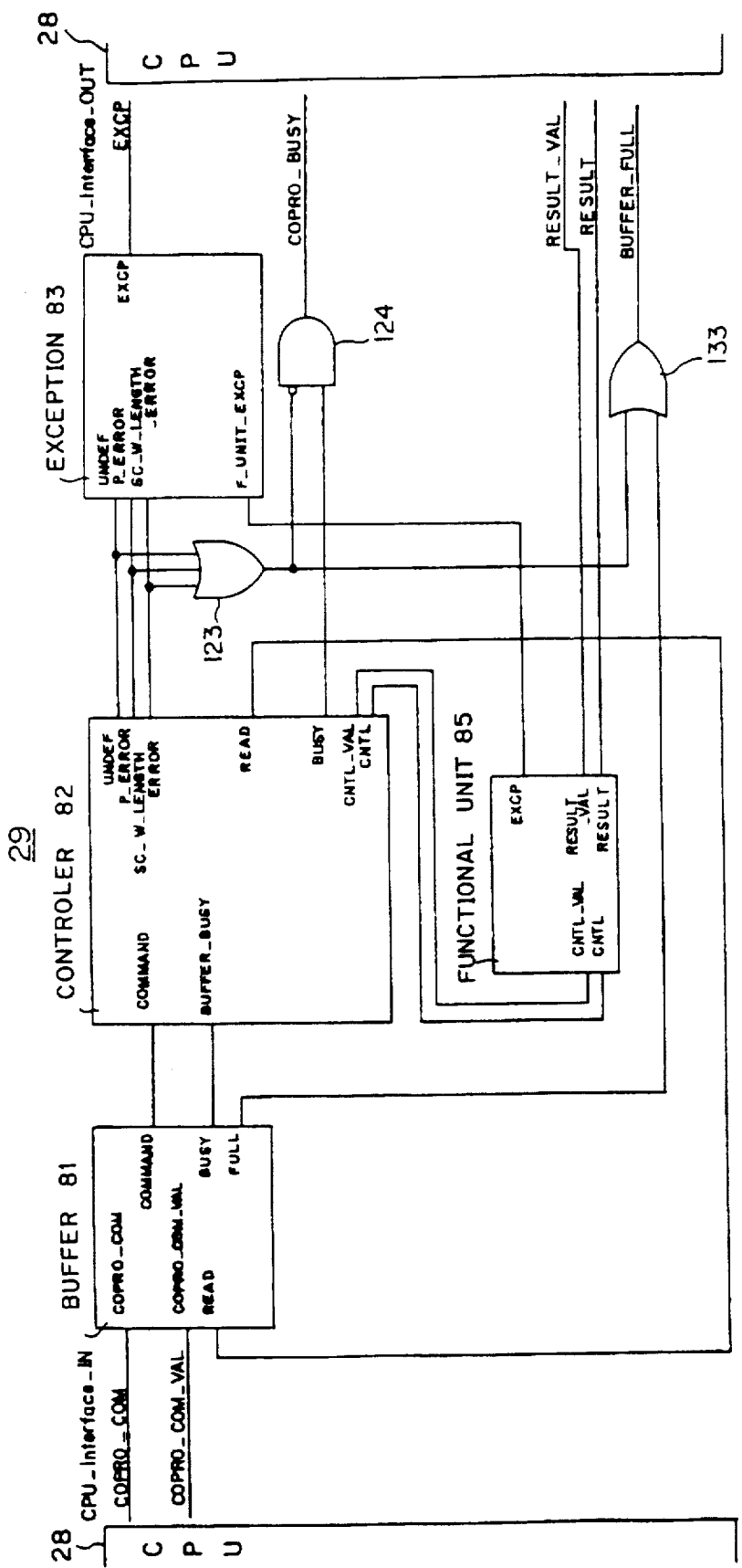
FIG. 21 shows an arrangement of a coprocessor for use with the CPU of FIG. 19.

FIG. 21 shows an arrangement of the coprocessor in the second embodiment of the present invention. An additional OR gate 133 is added to the first embodiment, to which is applied the output of OR gate 123 to output BUFFER_FULL so as to produce an additional abnormal state. To output the BUFFER_FULL when buffer 81 is also full, the FULL flag of buffer 81 is applied to OR gate 133. When the UNDEF, P_ERROR and SC_W_LENGTH_ERROR flags are all 0s, i.e., normal, the operation remains unchanged from that in the prior art. When at least one of them goes to 1, the output of AND gate 124, COPRO_BUSY, goes to 0 and the output of OR gate 133, BUFFER_FULL, goes to 1. The write address buffer in the second embodiment detects this state, producing EYY.

In the first embodiment, scoreboard 3 is reset by write address buffer 120 in the same way as in the prior art. In the second embodiment of the present invention as well, the circuitry which requests the service processor for processing can be removed. As a result described above, BUFFER_FULL becomes FULL or (not UNDEF or P_ERROR or SC_W_LENGTH_ERROR).

Figure 22:
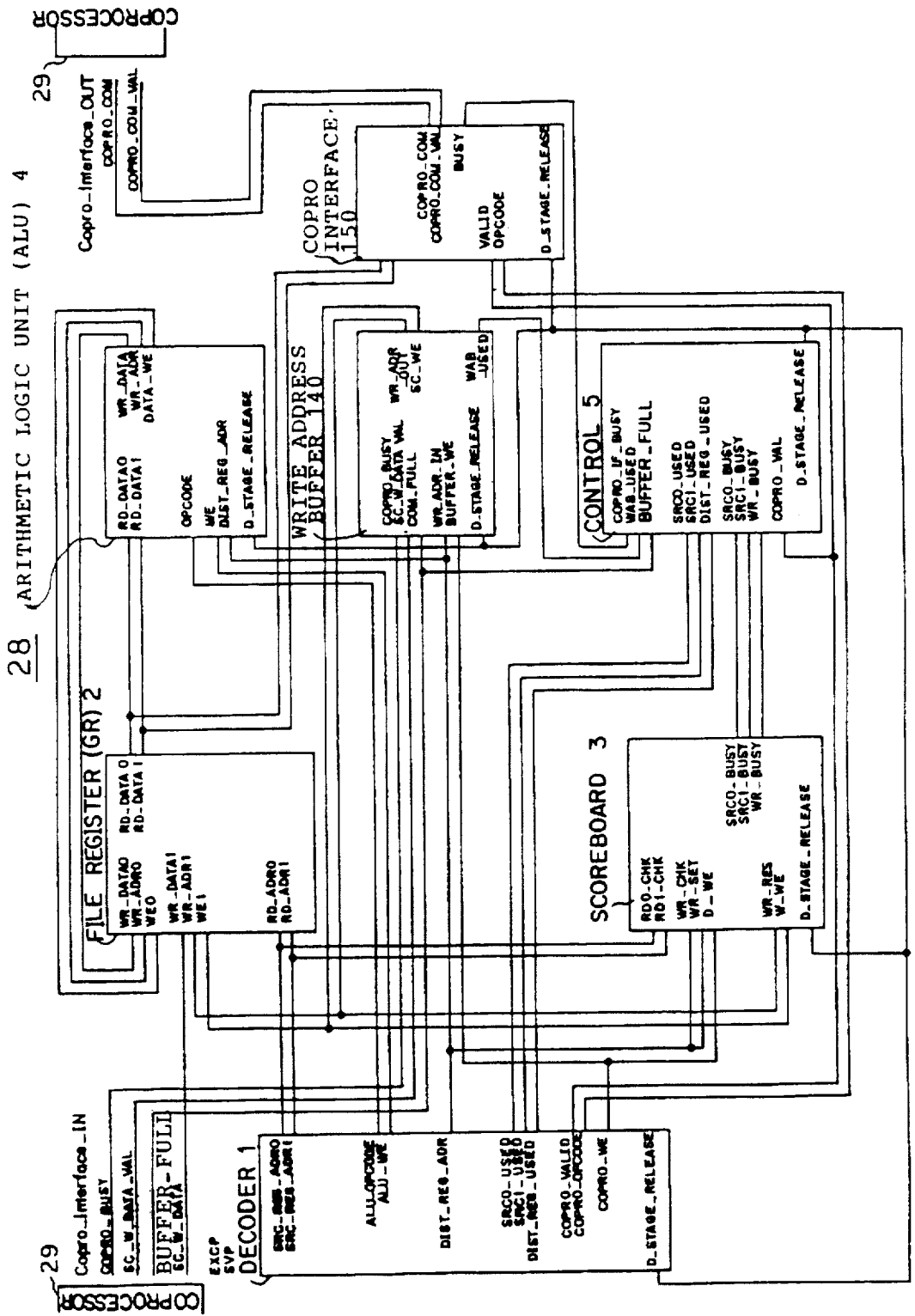
FIG. 22 shows an arrangement of a CPU according to a third embodiment of the present invention.

FIG. 22 shows an arrangement of a third embodiment of the present invention. In the third embodiment, there are provided write address buffer 140 and copro interface 150 which differ from those in the prior art in order to permit the write address buffer to detect abnormality and to permit CPU 28 to tell coprocessor 29 how many registers to be scalar written into. In the figure, like reference numerals are used to denote corresponding parts to those in the prior art.

Unlike the prior art, a circuit is added which sends information (SC_W_L_CPU) about the number of registers to be scalar written into which is confirmed by the CPU from decoder 160 to copro interface 150. Copro interface 150 is provided with a circuit which receives the SC_W_L_CPU from the decoder and outputs it to the coprocessor as COPRO_COM.

Figure 23:
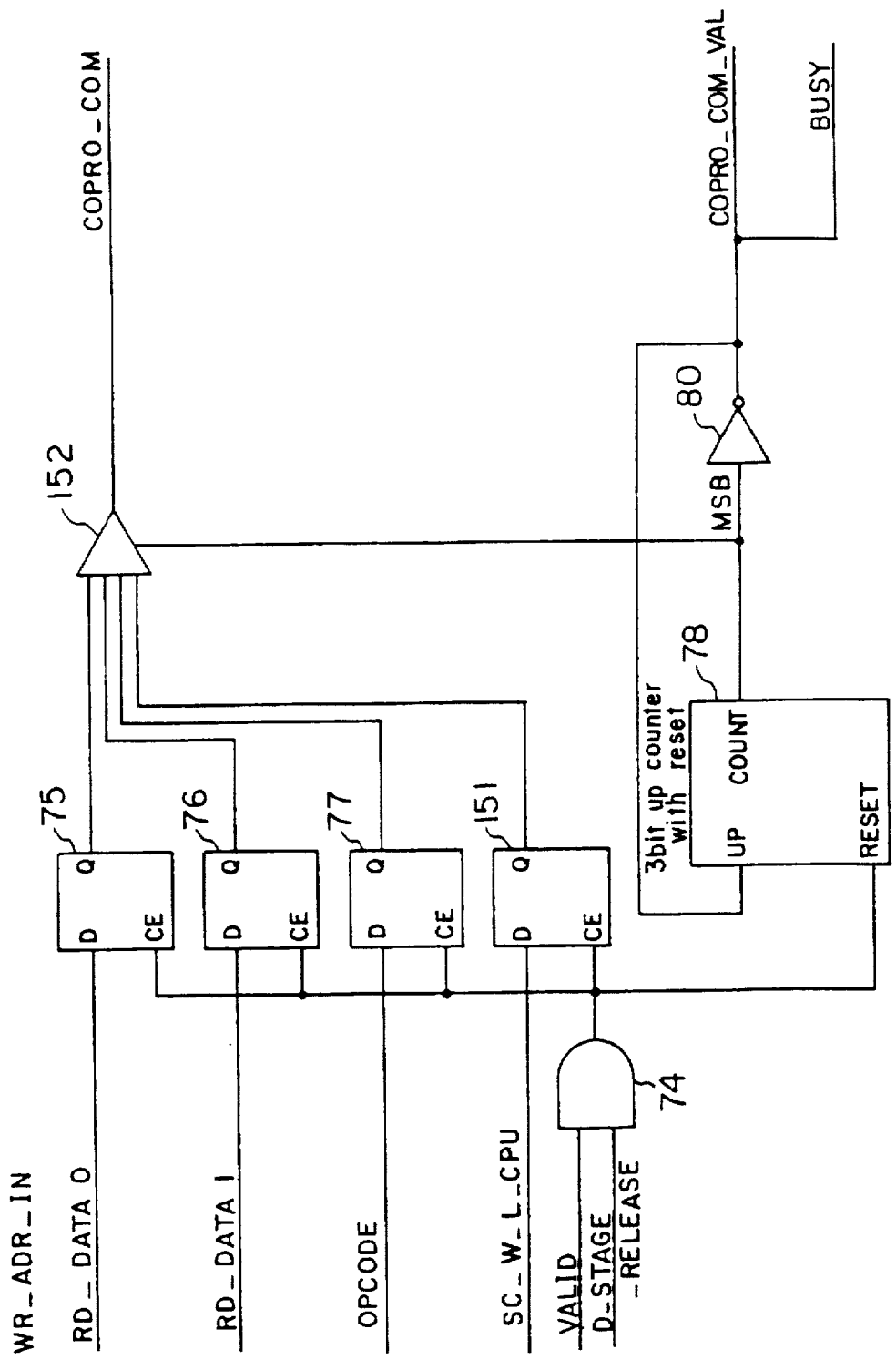
FIG. 23 shows an arrangement of the copro interface in FIG. 22.

FIG. 23 shows an arrangement of copro interface 150 shown in FIG. 22. In addition to three flip-flops 75, 76 and 77 which are installed in the prior art, the third embodiment of the present invention is provided with a flip-flop 151. The SC_W_L_CPU from decoder 160 is applied to flip-flop 151.

When VALID and D_STAGE_RELEASE are both 1s, AND gate 74 produces a 1, which enables flip-flops 75, 76, 77 and 151. As a result, flip-flops 75, 76, 77 and 151 are allowed to transfer OPCODE, RD_DATA1, RD_DATA2, and SC_W_L$_{13}$ CPU at their respective inputs to their respective outputs. At the same time, 3-bit up counter 78 is reset as up counter 78 has a reset terminal. In response to counter 78 being counted up, selector 152 selects each of the outputs of flip-flops 75, 76, 77 and 151 in turn as COPRO_COM.

The most significant bit, MSB is output by inverter 80 as COPRO_COM_VAL and BUSY and, at the same time, the output of the inverter 80 is applied to the up terminal of counter 78. When MSB=0, a 1 is applied to the up terminal of counter 78 by inverter 80, so that the counter is counted up. This enables selector 152 to select each of the outputs of flip-flops 75, 76, 77 and 151 in turn. When MSB goes to 1, counter 78 stops counting. This is a single transfer operation. When VALID and S_STAGE_RELEASE go to 1s again, counter 78 is reset again, repeating the same operation.

By the above operation, the CPU can tell the coprocessor the number of registers to be scalar written into through the C_W_L_CPU.

Figure 24:
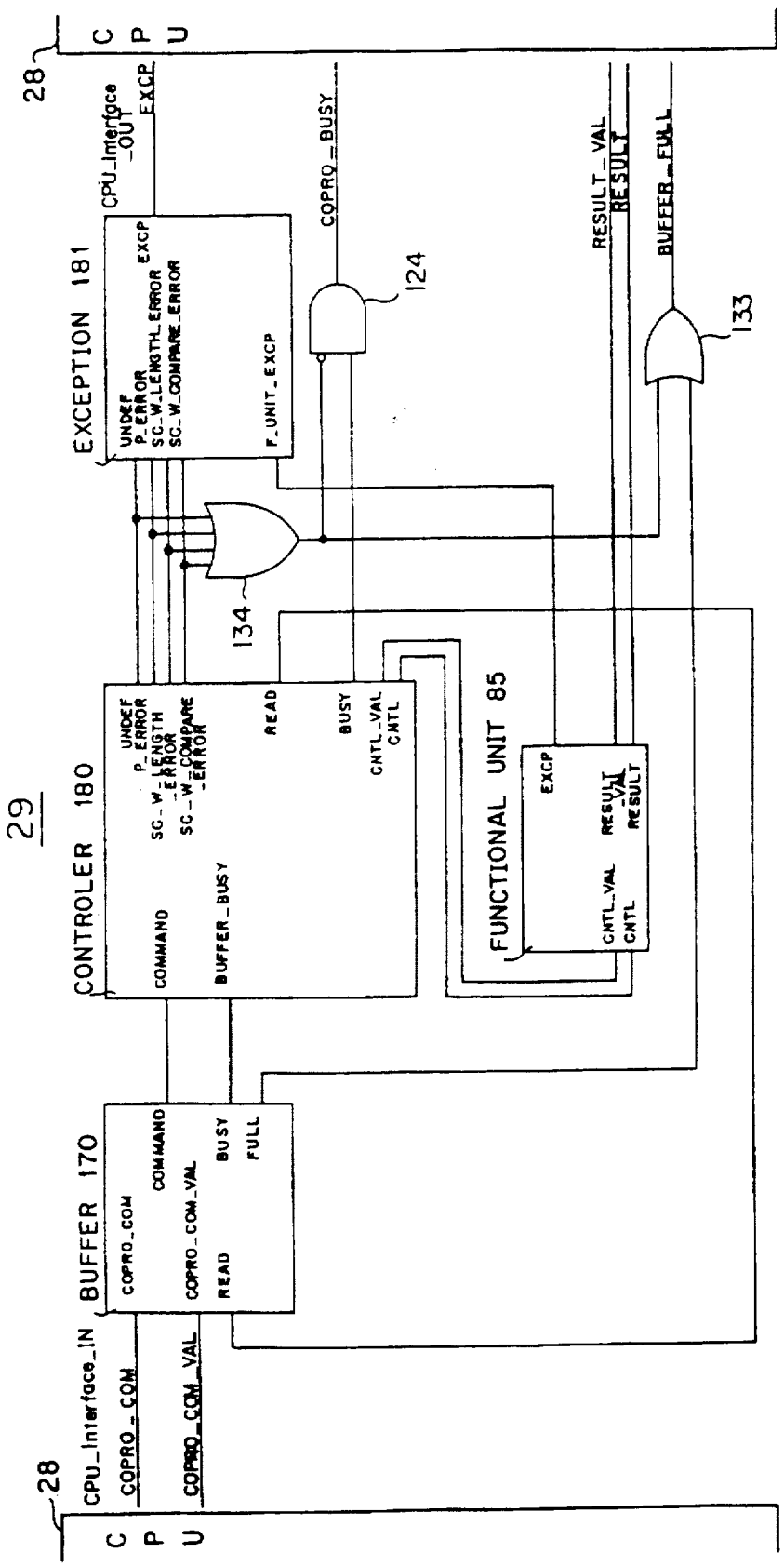
FIG. 24 shows an arrangement of a coprocessor for use with the CPU of FIG. 22.

FIG. 24 shows an arrangement of coprocessor 29 in the third embodiment of the present invention. Controller 180 in the coprocessor is provided with a comparator which makes a comparison between the number of registers to be scalar written into and the number of registers that the coprocessor actually scalar writes into. When the comparison indicates inequality, an SC_W_COMPARE_ERROR at 1 is output.

The UNDEF, P_ERROR, SC_W_LENGTH_ERROR and SC_W_COMPARE_ERROR are applied to OR gate 134. When one of these signals goes to a 1, the BUFFER_FULL signal at 1 is output from OR gate 133. At the same time, AND gate 124 causes the COPRO_BUSY to go to a 0. Exception unit 181 also uses the SC_W_COMPARE_ERROR signal for the same processing as the prior art. Buffer 170, which temporarily stores commands to be applied to the controller, operates identically to the prior art, but the number of buffers for commands differs. Although, in FIG. 24, the BUFFER_FULL is made a 1 on the occurrence of an error, the FULL signal output from buffer 170 may be used as the BUFFER_FULL as it is without OR gate 133. In this case, the occurrence of an error is detected by CPU 28.

Figure 25:
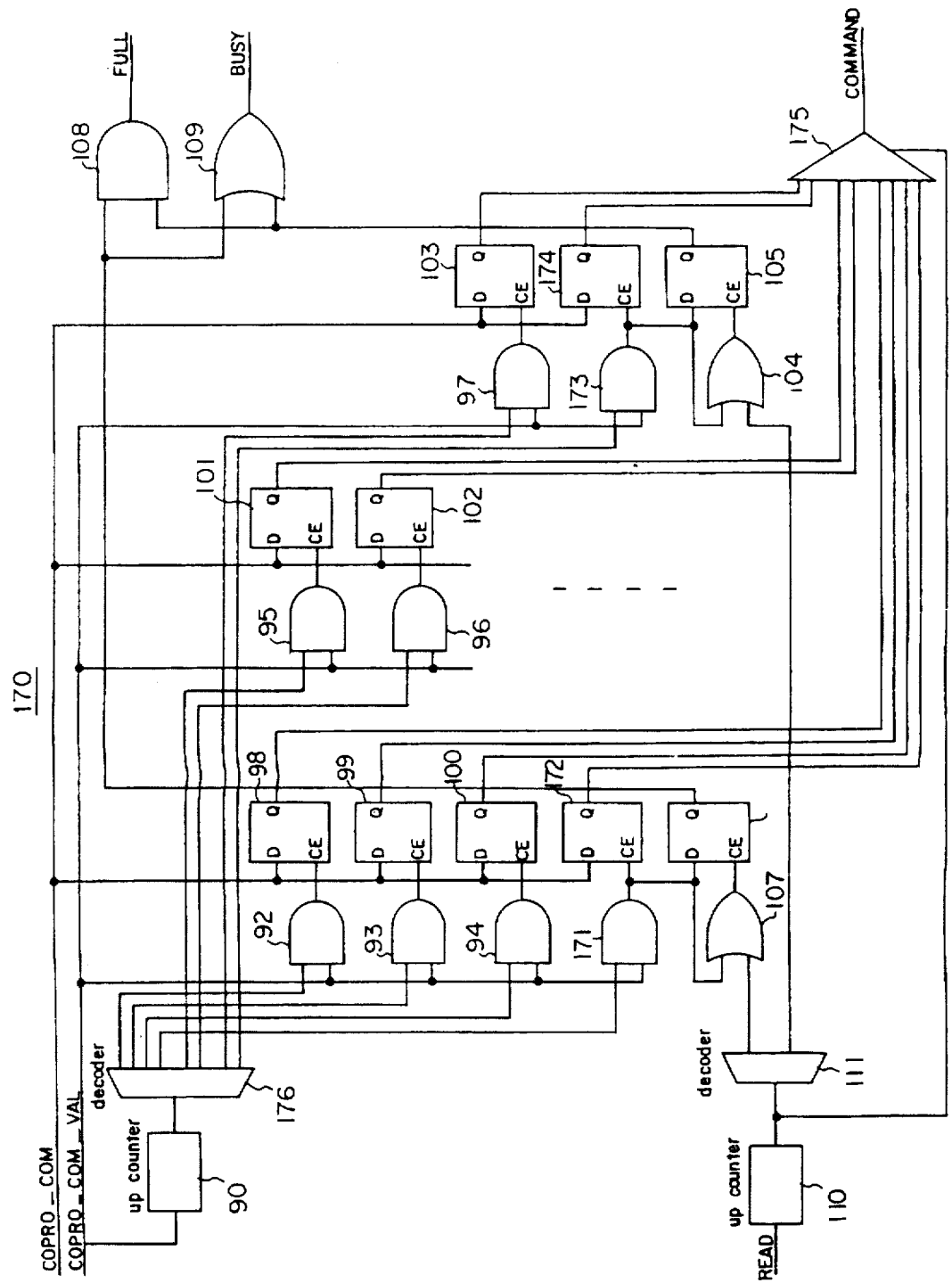
FIG. 25 shows an arrangement of the buffer in FIG. 24.

FIG. 25 shows an arrangement of the buffer in the third embodiment of the present invention. To the prior art buffer are added AND gate 171, flip-flop 172, AND gate 173, and flip-flop 174. In the prior art, three stages of CR data, i.e., three successive pieces of op-code data, are stored in flip-flops 98, 99 and 100. In the third embodiment, flip-flop 172 is added to store additional SC_W_L_CPU. For example, if RD_DATA0, RD_DATA1, OPCODE and SW_W_L_CPU are output in this order from the CPU, RD_DATA0 is stored in flip-flop 93, RD_DATA1 in flip-flop 99, OPCODE in flip-flop 100, and SC_W_L_CPU in flip-flop 172. To accommodate this modification, AND gate 173 and flip-flop 174 are added.

Information received by buffer 170 in coprocessor 29 is read, selected by selector 175, and then applied to controller 180 as commands. Controller 180 stores operands and data from the buffers in sequence. Decoder 176 is the same in arrangement as the prior art, but the number of its decode outputs is increased by the number of the additional buffers (flip-flops).

Controller 180 makes a comparison between the SC_W_L (the number of registers to be scalar written into) which is conventionally sent from CPU 28 to coprocessor 29 and the SC_W_L_CPU (the number of registers to be scalar written into that CPU 28 expects) which is sent in accordance with the present invention and, when the comparison indicates inequality, outputs the SC_W_COMPARE_ERROR.

Controller 180 requests buffer 170 to transfer an instruction through a READ signal. An instruction is transferred in a COMMAND signal. Since the COMMAND signal is a multiplex signal, a plurality of clocks are required to transfer one instruction. Controller 180 counts a READ signal transferred using a plurality of clocks and decodes the count results. An OPCODE is decoded by a decoder for subsequent comparison between the SC_W_L and SC_W_L_CPU. If the comparison indicates inequality and the BUFFER_VALID is 1, i.e., the contents of the buffer is valid, the SC_W_COMPARE_ERROR is made a 1, then output.

Figure 26:
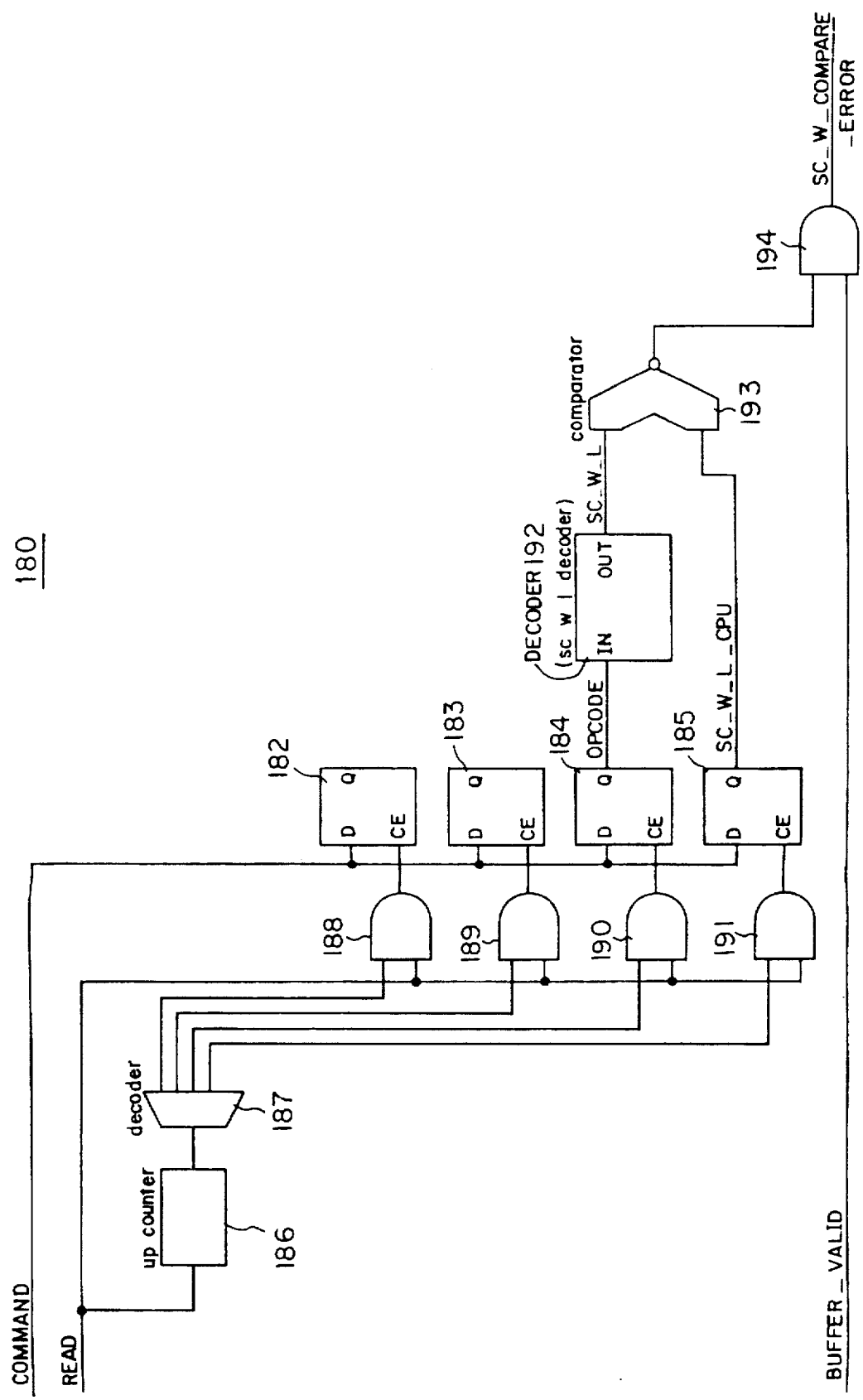
FIG. 26 shows an arrangement of the controller in FIG. 24.

FIG. 26 shows an arrangement of the controller in the third embodiment of the present invention. This figure shows only essential parts of the present invention.

Information output from buffer 170 is serially entered into buffers 182 to 185 as sequential commands. The read signal is applied to an up counter 186, which is counted up with each read. A decoder 187 decodes the count in counter 186, whereby decode outputs are sequentially applied to the inputs of AND gates 188, 189, 190 and 191, each of which is supplied at its other input with the READ signal. That is, since AND gates 188, 189, 190 and 191 are enabled in sequence by the decode outputs of decoder 187, flip-flops 182, 183, 184 and 185 are enabled in sequence by the READ signal. Therefore, commands serially transferred from buffer 170 are taken into flip-flops 182 to 185 sequentially.

Consequently, OPCODE and SC_W_L_CPU are taken into flip-flops 184 and 185, respectively. The other flip-flops 182 and 183 remain unchanged from the conventional corresponding ones.

Flip-flop 184 enters the OPCODE into a decoder (SC_W_I_DECODER) 192, which decodes the OPCODE to obtain the number of registers to be scalar written into within CPU 28 (SC_W_L_CPU). That is, the decoder outputs SC_W_L. On the other hand, flip-flop 185 outputs information SC_W_L_CPU decoded in CPU 28. A comparator 193 makes a decision as to whether an equality is found between SC_W_L and SC_W_L_CPU. When the equality results, the comparator produces a 0, which is output as SC_W_COMPARE_ERROR via an AND gate 194. That is, the SC_W_COMPARE_ERROR is made a 0 when there is no error.

If, on the other hand, the comparison indicates inequality, then comparator 193 will output a 1. When the BUFFER_FULL is 1, therefore, AND gate 194 causes the SC_W_COMPARE_ERROR to go to a 1, which is applied to OR gate 134 to thereby make the COPRO_BUSY a 0 and the BUFFER_FULL a 1.

This state is detected by the write address buffer in the CPU and error processing is then performed in the same way as other specified errors. The above-mentioned write address buffer 140 is the same as write address buffer 130 in FIG. 19.

The present invention has been described so far by considering CPU 28 and coprocessor 29 as configured separately. This is not restrictive. The CPU and the coprocessor may be provided on the same board or chip. Further, the CPU and the coprocessor may be provided on separate boards.

According to the present invention, even if how many registers the coprocessor will write into is unknown due to an exception event, the scoreboard can be reset to continue the execution of processing without increasing the number of signal lines between the coprocessor and the CPU and without the need of a service processor. Thereby, abnormality such as hang-up can be detected exactly and the CPU down-time can be reduced significantly.

What is claimed is:

1. An information processing device including a main processor which issues processing operations of a subprocessor as subprocessor instructions and a subprocessor which executes processing for said subprocessor instructions from said main processor and writes the results of said processing into registers in said main processor, said device comprising:

abnormality detection means, provided in said subprocessor, for detecting at least one of abnormalities of an undefined subprocessor instruction and an instruction execution error;

flag-off means, provided in said subprocessor, for turning off a flag indicating that processing is being performed when abnormality is detected, and means, provided in said main processor for deciding that abnormality has occurred when registers to be written into according to said subprocessor instruction remain unwritten and said flag is turned off.

2. The information processing device according to claim 1, in which, when deciding that abnormality has occurred, said main processor resets scoreboard bits corresponding to said registers which remain unwritten.

3. The information processing device according to claim 1, in which said instruction execution error is a parity error or a scalar write length error.

4. The information processing device according to claim 1, in which said abnormality detecting means comprises an OR gate, and said flag-off means comprises an AND gate which is supplied at its one input with the inverse of an output of said OR gate and at its other input said flag indicating that processing is being performed.

5. An information processing apparatus including a main processor which issues processing operations of a subprocessor as subprocessor instructions and a subprocessor which executes processing for said subprocessor instructions from said main processor and writes the results of said processing into registers in said main processor, said apparatus comprising:

abnormality detection means, provided in said subprocessor for detecting at least one of abnormalities of an undefined subprocessor instruction and an instruction execution error;

flag-off means, provided in said subprocessor, for turning off processing indicating a flag indicating that processing is being performed when abnormality is detected; and flag-on means, provided in said subprocessor, for turning on a buffer indicating flag indicating that buffers in said subprocessor are full when abnormality is detected; and means, provided in said main processor, for deciding that abnormality has occurred on the basis of a state where said processing indicating flag is off and said buffer indicating flag is on.

6. The information processing apparatus according to claim 5, in which, when deciding that abnormality has occurred, said main processor resets scoreboard bits corresponding to said registers which remain unwritten.

7. The information processing apparatus according to claim 5, in which said instruction execution error is a parity error or a scalar write length error.

8. An information processing apparatus including a main processor which issues processing operations of a subprocessor as subprocessor instructions and a subprocessor which executes processing for said subprocessor instructions from said main processor and writes the results of said processing into registers in said main processor, said apparatus comprising:

abnormality detection means, provided in said subprocessor for detecting at least one of abnormalities of an undefined subprocessor instruction and an instruction execution error;

flag-off means, provided in said subprocessor, for turning off processing indicating a flag indicating that processing is being performed when abnormality is detected;

flag-on means, provided in said subprocessor, for turning on a buffer indicating flag indicating that buffers in said subprocessor are full when abnormality is detected; and means, provided in said main processor, for deciding that abnormality has occurred on the basis of a state where said processing indicating flag is off and said buffer indicating flag is on, wherein said abnormality detecting means comprises an OR gate, said flag-off means comprises an AND gate which is supplied at its one input with the inverse of an output of said OR gate and at its other input said flag indicating that processing is being performed, and said flag-on means comprises an OR gate, the output of which is turned on when said buffers are full or when the output of said OR gate is on.

9. A information processing apparatus including a main processor which issues processing operations of a subprocessor as subprocessor instructions and a subprocessor which executes processing for said subprocessor instructions from said main processor and writes the results of said processing into registers in said main processor, in said apparatus comprising:

transfer means, provided in said main processor, for, together with an subprocessor instruction, transferring to said subprocessor information as to the number of registers in said main processor to be written into by said subprocessor instruction, and compare means, provided in said subprocessor, for making a comparison between the number of registers in said main processor to be written into by said subprocessor instruction and the number of registers transferred by said transfer means; and abnormality decision means, provided in said subprocessor, for deciding that abnormality has occurred when the result of said comparison indicates inequality.

10. The information processing apparatus according to claim 9, in which said abnormality decision means considers an defined subprocessor instruction, a parity error, or a scalar write length error to be abnormal.

11. The information processing apparatus according to claim 9, wherein said subprocessor further comprising:

flag-off means for alerting said main processor of the occurrence of abnormality when said abnormality decision means decides that abnormality has occurred, and wherein said main processor decides that abnormality has occurred when registers to be written into by a subprocessor instruction remain unwritten and said processing indicating flag is turned off.

12. The information processing apparatus according to claim 9, wherein said subprocessor further comprising:

flag-off means for alerting said main processor of abnormality when said abnormality decision means decides that abnormality has occurred, and flag-on means for turning on a flag indicating that buffers are full, wherein said main processor decides that abnormality has occurred on the basis of a state in which a processing indicating flag is off and said flag indicating that buffers are full is on.

13. An information processing apparatus including a main processor which issues processing operations of a subprocessor as subprocessor instructions and a subprocessor which executes processing for said subprocessor instructions from said main processor and writes the results of said processing into registers in said main processor, in said apparatus comprising:

transfer means, provided in said main processor, for, together with a subprocessor instruction, transferring to said subprocessor information as to the number of registers in said main processor to be written into by said subprocessor instruction; and compare means, provided in said subprocessor, for making a comparison between the number of registers in said main processor to be written into by said subprocessor instruction and the number of registers transferred by said transfer means; and abnormality decision means, provided in said subprocessor, for decoding that abnormality has occurred when the result of said comparison indicates inequality, wherein said subprocessor further comprises flag-off means for alerting said main processor of abnormality when said abnormality decision means decides that abnormality has occurred, and flag-on means for turning on a flag indicating that buffers are full, wherein said main processor decides that abnormality has occurred on the basis of a state in which a processing indicating flag is off and said flag indicating that buffers are full is on, wherein:

said abnormality detecting means comprises an OR gate, said flag-off means comprises an AND gate which is supplied at its one input with the inverse of an output of said OR gate and at its other input said processing indicating flag, and said flag-on means comprises an OR gate the output of which is turned on when said buffers are full or when the output of said OR gate is on.

14. An information processing system comprising:

a main processor including an instruction decoder for decoding an instruction and controlling processing for said instruction, a register file consisting of a plurality of registers for storing data, register interference detect means for storing whether data needs to be stored in said register file, subprocessor instruction transmitting means for transmitting an subprocessor instruction, data receive means for receiving data and writing it into said register file, and register write designator holding means for holding write designator information including the numbers of registers in said register file to be written into; and a subprocessor including, subprocessor instruction holding means for holding information associated with said subprocessor instruction transmitted from said main processor, subprocessor control means for decoding information stored in said subprocessor instruction holding means and executing said subprocessor instruction, subprocessor arithmetic operation means for performing arithmetic operation processing under the control of said subprocessor control means, transfer means for transferring the results of said arithmetic operation processing by said subprocessor arithmetic operation means to said main processor, and exceptional event detect means for detecting that transfer to and from said main processor or inside transfer has not been made properly, wherein, at instruction execution time, in said main processor, when a subprocessor instruction is decoded by said instruction decoder, said subprocessor instruction transmitting means transmits said subprocessor instruction to said subprocessor and, at the same time, when said subprocessor instruction is decoded to be an instruction to write the results of processing by said subprocessor into registers in said main processor, said register write designators are held in said register write designator holding means and said register interference detecting means is controlled so as to make valid a register interference wait for registers indicated by said write designators, wherein in said subprocessor in which said subprocessor instruction is received by said subprocessor instruction holding means, said subprocessor control means controls said subprocessor arithmetic operation means to perform arithmetic operations according to said subprocessor instruction, and when said subprocessor instruction is decoded by said subprocessor control means to be an instruction to transfer the results of processing by said subprocessor arithmetic operation means to said main processor, data on the results of processing is transferred to said main processor via said transfer means, wherein in said main processor, said data receive means receives said data from said subprocessor and writes said data into said register file according to the register numbers held by said register write designator holding means, and said register interference detecting means is controlled so as to make invalid a register interference wait for registers indicated by said write designators, said subprocessor includes transfer means for transferring to said main processor a subprocessor execution signal indicating that said subprocessor is performing processing, wherein when said subprocessor cannot write data into said main processor properly because of detection of an exceptional event by said subprocessor during subprocessor instruction execution, said main processor makes a corresponding register interference wait invalid according to write register numbers held by said register write designator holding means when said main processor decides, based on said subprocessor execution signal, that said subprocessor is stopped and write designators for registers which have not been written into are still held by said register write designator holding means.

15. An information processing system comprising, a main processor including, an instruction decoder for decoding an instruction and controlling processing for said instruction, a register file consisting of a plurality of registers for storing data, register interference detect means for storing whether data needs to be stored in said register file,

23 subprocessor instruction transmitting means for transmitting an subprocessor instruction, data receive means for receiving data and writing it into said register file, and register write designator holding means for holding write designator information including the numbers of registers in said register file to be written into; and a subprocessor including, subprocessor instruction holding means for holding information associated with said subprocessor instruction transmitted from said main processor, subprocessor control means for decoding information stored in said subprocessor instruction holding means and executing said subprocessor instruction, subprocessor arithmetic operation means for performing arithmetic operation processing under the control of said subprocessor control means, transfer means for transferring the results of said arithmetic operation processing by said subprocessor arithmetic operation means to said main processor, and exceptional event detect means for detecting that transfer from said main processor or inside transfer has not been made properly, wherein at instruction execution time, in said main processor, when said subprocessor instruction is decoded by said instruction decoder, said subprocessor instruction transmitting means transmits said subprocessor instruction to said subprocessor and, at the same time, when said subprocessor instruction is decoded to be an instruction to write the results of processing by said subprocessor into registers in said main processor, said register write designators are held in said register write designator holding means and said register interference detecting means is controlled so as to make valid register interference waiting for registers indicated by said write designators, wherein, in said subprocessor in which said subprocessor instruction is received by said subprocessor instruction holding means, said subprocessor control means controls said subprocessor arithmetic operation means to perform arithmetic operations according to said subprocessor instruction, and when said subprocessor instruction is decoded by said subprocessor control means to be an instruction to transfer the results of processing by said subprocessor arithmetic operation means to said main processor, data on the results of processing is transferred to said main processor via said transfer means, wherein, in said main processor, said data receive means receives said data from said subprocessor and writes said data into said register file according to the register numbers held by said register write designator holding means, and said register interference detecting means is controlled so as to make invalid a register interference waiting state for registers indicated by said write designators, upon detecting an exceptional event during execution of a subprocessor instruction, said subprocessor alerts said main processor of the detection of said exceptional event, and that, when said register write designator holding means indicates that said subprocessor will rewrite said register file, said main processor which has been alerted to said exceptional event by said subprocessor makes invalid a register interference wait for registers corresponding to write register numbers held by said register write designator holding means.

24

16. An information processing system comprising:

a main processor including, an instruction decoder for decoding an instruction and controlling processing for said instruction, a register file consisting of a plurality of registers for storing data, register interference detect means for storing whether data needs to be stored in said register file, subprocessor instruction transmitting means for transmitting an subprocessor instruction, data receive means for receiving data and writing it into said register file, and register write designator holding means for holding write designator information including the numbers of registers in said register file to be written into; and a subprocessor including subprocessor instruction holding means for holding information associated with said subprocessor instruction transmitted from said main processor, subprocessor control means for decoding information stored in said subprocessor instruction holding means and executing said subprocessor instruction, subprocessor arithmetic operation means for performing arithmetic operation processing under the control of said subprocessor control means, transfer means for transferring the results of said arithmetic operation processing by said subprocessor arithmetic operation means to said main processor, and exceptional event detect means for detecting that transfer from said main processor or inside transfer has not been made properly, wherein at instruction execution time, in said main processor, when a subprocessor instruction is decoded by said instruction decoder, said subprocessor instruction transmitting means transmits said subprocessor instruction to said subprocessor and, at the same time, when said subprocessor instruction is decoded to be an instruction to write the results of processing by said subprocessor into registers in said main processor, said register write designators are held in said register write designator holding means and said register interference detecting means is controlled so as to make valid register interference waiting for registers indicated by said write designators, wherein in said subprocessor in which said subprocessor instruction is received by said subprocessor instruction holding means, said subprocessor control means controls said subprocessor arithmetic operation means to perform arithmetic operations according to said subprocessor instruction, and when said subprocessor instruction is decoded by said subprocessor control means to be an instruction to transfer the results of processing by said subprocessor arithmetic operation means to said main processor, data on the results of processing is transferred to said main processor via said transfer means, wherein in said main processor, said data receive means receives said data from said subprocessor and writes said data into said register file according to the register numbers held by said register write designator holding means, and said register interference detecting means is controlled so as to make invalid a register interference wait for registers indicated by said write designators, said main processor includes number-of-registers-to-be-written-into information transfer means for transferring to said subprocessor information indicating the number of registers to be written into by said subprocessor, said information being obtained by decoding a subprocessor instruction in said instruction decoder, said exceptional event detecting means includes compare means for making a comparison between information indicating the number of registers to be written into by said subprocessor and decoded by said subprocessor control means and said number-of-registers-to-be-written-into information transferred by said transfer means, wherein said subprocessor alerts said main processor to the detection of an exceptional event when the comparison indicates inequality, wherein when said register write designator holding means indicates that said subprocessor will rewrite said register file, said main processor which has been alerted to said exception event makes invalid a corresponding register interference wait for registers according to to-be-written-into register numbers held by said register write designator holding means.

17. An information processing device including a main processor which issues processing operations of a subprocessor as subprocessor instructions and a subprocessor which executes processing for said subprocessor instructions from said main processor and writes the results of said processing into registers in said main processors; comprising:

abnormality detection means for detecting at least one of abnormalities of an undefined subprocessor instruction and an instruction execution error;

flag-off means for turning off a processing indicating flag indicating that processing is being performed when abnormality is detected;

flag-on means for turning on a buffer indicating flag indicating that buffers in said subprocessors are full when abnormality is detected; and means for deciding that abnormally has accused on the basis of a state where said processing indicating flag is off and said buffer indicating flag is on.

18. An information processing device which includes:

a main processor for issuing subprocessor instructions, and a subprocessor for executing a processing corresponding to said subprocessor instructions from said main processor, said device comprising:

means for switching on/off at least one of a flag indicating to said main processor that a processing corresponding to said subprocessor instructions is being performed and a flag indicating that buffers which said subprocessor comprises are full when an error related to said subprocessor instructions is detected, is provided with said subprocessor, and abnormality occurrence decision means for making a decision according to contradiction between an inside storage state corresponding to issue of said subprocessor instructions with a flag of said subprocessor indicating state is provided with said main processor.

* * * * *